United States Patent
Satoh et al.

[11] Patent Number: 5,804,526
[45] Date of Patent: Sep. 8, 1998

[54] ADSORBENT FOR NITROGEN OXIDES AND EXHAUST EMISSION CONTROL CATALYST

[75] Inventors: Naohiro Satoh; Kazuhide Terada; Takeshi Narishige; Yoshikazu Fujisawa, all of Saitama, Japan

[73] Assignee: Honda Giken Kogyo Kabushiki Kaisha, Tokyo, Japan

[21] Appl. No.: 762,026

[22] Filed: Dec. 11, 1996

Related U.S. Application Data

[63] Continuation of Ser. No. 453,707, May 30, 1995, abandoned.

[30] Foreign Application Priority Data

Sep. 29, 1993 [JP] Japan ................................. 5-243348
Sep. 19, 1994 [JP] Japan ................................. 6-223702
Sep. 29, 1994 [WO] WIPO ................... PCT/JP94/01613

[51] Int. Cl.⁶ .......................... B01F 23/10; B01F 29/068; B01F 29/44
[52] U.S. Cl. ................. 502/304; 502/64; 502/65; 502/66; 502/302; 502/303; 502/525
[58] Field of Search .................... 502/525, 302, 502/303, 304, 64, 65, 66

[56] References Cited

U.S. PATENT DOCUMENTS 4,791,091 12/1988 Bricker ................................... 502/303
4,849,398 7/1989 Takada et al. ......................... 502/303
5,164,350 11/1992 Abe et al. ............................... 502/66

FOREIGN PATENT DOCUMENTS 2293050 of 1990 Japan.
2258058 11/1990 Japan.

*Primary Examiner*—Glenn Caldarola
*Assistant Examiner*—Alexander G. Ghyka
*Attorney, Agent, or Firm*—Lyon & Lyon LLP

[57] ABSTRACT

An adsorbent exhibiting an excellent adsorption ability to nitrogen oxides (NO) is made from an oxide-based ceramics having an average crystallite grain size D in a range of $D<500$ Å, e.g., $CeO_2$. A catalyst is formed from, for example, an cerium oxide ($CeO_2$) and a zeolite. A content C of $CeO_2$ in the catalyst is set in a range of 10% by weight $\leq CA \leq 80\%$ by weight. The zeolite adsorbs hydrocarbon (HC). The hydrocarbon (HC) adsorbed is oxidized into active CHO which acts to reduce the nitrogen oxides (NO) adsorbed by the $CeO_2$.

8 Claims, 20 Drawing Sheets

ADSORBENT FOR NITROGEN OXIDES AND EXHAUST EMISSION CONTROL CATALYST

This application is a Continuation Application of application Ser. No. 08/453,707 filed on May 30, 1995 now abandoned.

FIELD OF THE INVENTION

The present invention relates to an adsorbent for nitrogen oxides and an exhaust emission control catalyst.

PRIOR ART

There are conventionally known adsorbents nitrogen oxides, made of oxide-based ceramics, e.g., double oxides (for example, see Japanese Patent Application Laid-open No.258058/90).

An exhaust emission control catalyst made from a double oxide and zeolite are also known (for example, see Japanese Patent Application Laid-open No.293050/90).

Generally, the above-described double oxide is in the form of polycrystalline aggregates each formed of a plurality of crystallites. However, in the course of manufacture of the known double oxide, a firing is carried out at a high temperature (e.g., 900° C.), and hence, the crystallites have a large average grain size D in a range of $D \geq 500$ Å. Accordingly, the known double oxide suffers a problem that it has a small surface area and also has undeveloped fine pores, and hence, the probability of contact with nitrogen oxides is low, and particularly, the rate of adsorption of nitrogen oxides per unit weight is low under an environment containing an excessive amount of oxygen.

The double oxide in the known catalyst also has a structure similar to that described above and therefore, has a low ability of adsorbing and converting nitrogen oxides.

SUMMARY OF THE INVENTION

It is a first object of the present invention to provide an adsorbent of the above-described type for nitrogen oxides, which is made from oxide-based ceramics having a specified average crystallite grain size D and which is capable of exhibiting an excellent adsorbing ability to nitrogen oxides.

It is a second object of the present invention to provide a catalyst of the above-described type, which contains an adsorbent of the above-described type as a necessary forming component and which is capable of exhibiting an adsorbing ability to nitrogen oxides in a wide range of temperature of an exhaust gas.

Further, it is a third object of the present invention to provide a catalyst of the above-described type, which contains an adsorbent of the above-described type as a necessary forming component and which is capable of exhibiting an adsorbing ability to nitrogen oxides in a wide range of temperature of an exhaust gas and has a good thermal deterioration resistance.

To achieve the above object, according to the present invention, there is provided an adsorbent for nitrogen oxides, which is made of oxide-based ceramics having an average crystallite grain size D in a range of $D<500$ Å For the absorbent, the oxide-based ceramics include lanthanoide oxides, e.g., cerium oxide ($CeO_2$), and double oxides, e.g., $LaCoO_3$ having a perovskite structure.

According to the present invention, there is also provided an exhaust emission control catalyst which is made from oxide-based ceramics having an average crystallite grain size D in a range of $D<500$ Å and zeolite, the oxide-based ceramics being a lanthanoide oxide, a content C of the lanthanoide oxide being in a range of 10% by weight $\leq C \leq 80\%$ by weight.

The catalysts include those made using, as the oxide-based ceramics, a modified lanthanoide oxide having at least one modifying element selected from the group consisting of Zr, La and Si and borne in the lanthanoide oxide. A content C of the modified lanthanoide oxide is set in a range of 10% by weight $\leq C \leq 80\%$ by weight.

Further, the catalysts include those made using a double oxide as the oxide-based ceramics. A content C of the double oxide is set in a range of 10% by weight $\leq C \leq 80\%$ by weight.

Furthermore, the catalysts include those made using a lanthanoide oxide and a double oxide as the oxide-based ceramics. A content c of these oxides is set in a range of 20% by weight $\leq C \leq 6$ 80% by weight. In this case, it is required that a content $C_1$ of the lanthanoide oxide is in a range of $C_1 \geq 10\%$ by weight, and the content $C_2$ of the double oxide is in a range of $C_2 \geq 10\%$ by weight.

The catalysts include those comprising zeolite and Ag borne or carried therein. The amount CA of Ag carried is set in a range of 1% by weight $\leq CA \leq = 10\%$ by weight.

Further, the catalysts include those made using as the zeolite, a heat resistant modified zeolite produced by the dealuminization of an unmodified zeolite.

If the average crystallite grain size D of the oxide-based ceramics in the adsorbent is set in the above-described range, the specific surface area of the oxide-based ceramics can be increased, and the fine pores can be developed. Therefore, the probability of contact of the oxide-based ceramics with the nitrogen oxides (NOx) can be increased, thereby enhancing the percent adsorption of the NOx per unit weight even under an atmosphere containing an excessive amount of oxygen.

If the oxide-based ceramics is combined with the zeolite in the catalyst, a hydrocarbon (HC) in the exhaust gas is adsorbed by the zeolite, and NOx is adsorbed by the oxide-based ceramics. The zeolite functions as a relatively weak oxidizing agent, and therefore, it partially oxidizes the hydrocarbon (HC) adsorbed by the zeolite and activated, thereby producing active CHO.

This active CHO acts to reduce nitrogen oxides (NOx) adsorbed to the oxide-based ceramics and activated into $N_2$, $CO_2$ and $H_2O$, thereby achieving the conversion of the nitrogen oxides (NOx). In this case, the CHO is liable to be produced from an unsaturated hydrocarbon (HC) than from a saturated hydrocarbon (HC), and free NOx is low in activity, as compared to the adsorbed NOx.

The adsorption of hydrocarbon (HC) and NOx, the production of the active CHO by the partial oxidization of HC and the reduction of NOx by the active CEO occur in a range of from a low temperature to a high temperature of an exhaust gas. This leads to an extended range of temperature at which the catalyst is active.

Further, in an unused catalyst (which is not put into the purification of an exhaust gasp after being produced) produced using a modified lanthanoide oxide bearing Zr or both of Zr and La as the oxide-based ceramics, the number of lattice defects in the modified lanthanoide oxide is increased, resulting in an increased number of active sites capable of adsorbing NOx and therefore, the conversion rate of NOx is improved over the case of a catalyst produced using an unmodified lanthanoide oxide.

On the other hand, the lanthanoide oxide is in the form of polycrystalline aggregates each formed of a plurality of crystallites and hence, if the lanthanoide oxide is exposed under a high-temperature environment, the average crystallite grain size thereof tends to be increased, resulting in a reduced number of active sites capable of adsorbing NOx.

However, even if the modified lanthanoide oxide bearing at least one modifying element is exposed to a high temperature, the increase in average crystallite grain size of the modified lanthanoide oxide is inhibited by Zr or the like. Thus, the catalyst produced using the modified lanthanoide oxide has a good thermal-deterioration resistance.

Further, If Ag is borne or carried in the zeolite, the amount of unsaturated hydrocarbon (HC) adsorbed in the zeolite is increased. This makes it possible to increase the amount of active CHO produced to enhance the conversion rate of NO-x, particularly at low temperatures.

If a modified zeolite resulting from a dealuminization is used, it has a heat-resisting temperature of about 1,000° C., because the crystallizability of the modified zeolite is enhanced, as compared with the unmodified zeolite, and the generation of thermally decomposed product is suppressed. Moreover, the modified zeolite has a higher hydrocarbon (HC) adsorbing ability than the unmodified zeolite and exhibits an excellent HC adsorbing ability in a wider temperature range.

However, if the content C of the lanthanoide oxide or the modified lanthanoide oxide in the catalyst is lower than 10% by weight, of if the content C of the double oxide is lower than 20% by weight, or if the content C of the oxide mixture is lower than 20% by weight and each of the contents $C_1$ and $C_2$ of the lanthanoide oxide and the double oxide is lower than 10% by weight, the NOx adsorption rate exhibited by them is reduced, resulting in a reduced purification rate for NOx.

On the other hand, if the content C of each of the lanthanoide oxide, the modified lanthanoide oxide, the double oxide and the oxide mixture is lower than 80% by weight, the volume of zeolite is reduced and hence, the reduced hydrocarbon (HC) adsorption rate provided by the zeolite is reduced, resulting in a reduced purification rats for NOx.

If the content CA of Ag borne or carried is lower than 1% by weight, the effect for increasing the amount of unsaturated hydrocarbon (HC) adsorbed is poor. On the other hand, even if the content CA of Ag borne is set in a range of CA>10% by weight, a remarkable effect cannot be achieved.

DESCRIPTION OF THE PREFERRED EMBODIMENT

Figure 1:
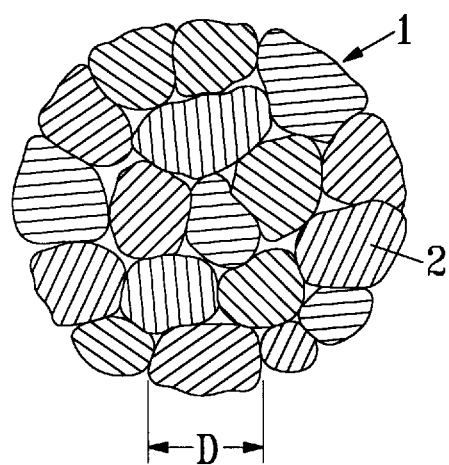
FIG. 1 is a diagrammatic illustration of an oxide-based ceramics.

A. Absorbent for nitrogen oxides Referring to FIG. 1, an oxide-based ceramics 1 forming an adsorbent for nitrogen oxides (NOx, but NO in the embodiment) is comprised of polycrystalline aggregates, each of which is formed of a plurality of crystallites 2 having an average grain size D set in a range of D<500Å.

Such oxide-based ceramics include lanthanoide oxides, modified lanthanoide oxides and double oxides. Examples of the lanthanoide oxides which may be used are cerium oxide ($CeO_2$), $Pr_6O_{11}$, $Tb_4O_7$ and the like. The lanthanoide oxide has a NO-adsorbing ability or capability, a relatively weak oxidizing ability or capability to hydrocarbon (HC), and an oxygen storing capability.

The modified lanthanoide oxide is a lanthanoide oxide bearing at least one modifying element selected from the group consisting of Zr, La and Si. The term "bearing" means a state in which the modifying element is mechanically, physically or chemically borne or carried in the lanthanoide oxide and/or a state in which the lanthanoide oxide and the oxide of the modifying element form a double oxide.

In the modified lanthanoide oxide bearing Zr or both Zr and La, the number of lattice defects is increased, resulting in an increase in active sites capable of adsorbing nitrogen oxide (NOx). Even if the modified lanthanoide oxide bearing at least one modifying element is subjected to a high temperature, the increase in average crystalline grain size of the modified lanthanoide oxide is inhibited by Zr or the like.

Examples of the double oxides which may be used are those having a perovskite structure such as $LaCoO_3$, $LaMnO_3$, $La_{0.8}Sr_{0.2}CoO_3$ as well as $La_{1.5}Sr_{0.5}CuO_4$, $YBa_2Cu_3O_7$, $Mn_2ZrO_5$ and the like. The double oxide has a NO adsorbing capability and a relatively weak oxidizing capability to hydrocarbon (HC).

In producing a lanthanoide oxide, any one of the various salts such as lanthanoide carbonates, oxalates, nitrates is heated in the presence of oxygen. When it is desired to produce a pure lanthanoide oxide free of any of rare earth elements, the lanthanoide oxide resulting from the heating is washed with a nitric acid.

The control of the average crystalline grain size D is performed by adjusting the heating temperature in the producing course. For example, when it is desired to produce cerium oxide ($CeO_2$) having an average crystallite grain size D equal to 20 Å, cerium nitrate is heated to about 200° C. After production of cerium oxide ($CeO_2$), the average crystalline grain size D of the cerium oxide can be controlled by subjecting the cerium oxide to a thermal treatment. For example, if cerium oxide ($CeO_2$) having an average crystallite grain size D equal to 20 Å is subjected to a thermal treatment at 700° C. for 20 hours, cerium oxide ($CeO_2$) having an average crystallite grain size D equal to 300 Å is produced.

In producing the modified lanthanoide oxide, a coprecipitation process or an impregnation process is generally utilized, but another process may be utilized.

In the co-precipitation process, a procedure is employed which comprises the steps of:

(a) dissolving a lanthanoide nitrate, e.g., $Ce(NO_3)_3$ and $Zr(NO_3)_4$ or $La(NO_3)_3$ or silicic acid (e.g., $H_4SiO_4$) into water (into hot water in the case of silicic acid for the purpose of promoting the dissolving) to prepare a solution, (b) adding $NH_4OH$ into the solution for hydrolysis to prepare a suspension, (c) evaporating the suspension to dryness to provide solids, and (d) subjecting the solids to a firing in the atmosphere at 600° C. for 1 hour.

In the impregnation process, a procedure is employed which comprises the steps of:

(a) dissolving $ZrO(NO_3)_2$ or $La(NO_3)_3$ or silicic acid (e.g., $H_4SiO_4$) into water (into hot water in the case of silicic acid for the purpose of promoting the dissolving) to prepare a solution, (b) dispersing a lanthanoide oxide powder, e.g., a cerium oxide ($CeO_2$) powder into the solution to prepare a suspension, (c) evaporating the suspension to dryness to provide solids, and (d) subjecting the solids to a firing in the atmosphere at 600° C. for 1 hour.

For example, when two modifying elements are borne in the lanthanoide oxide, the coprecipitation process and the impregnation process are employed in combination.

The modified lanthanoide oxide produced by the above-described process is a mixture of a lanthanoide oxide and a double acid comprising a modifying element oxide and a lanthanoide oxide.

The content of the modifying element in the modified lanthanoide oxide is suitably in a range of 3 to 10% by weight when Zr is used alone, and in a range of 1 to 10% by weight when La or Si is used alone. When two or more modifying elements are used, the total content of these modifying elements is suitably in a range of 2 to 20% by weight. If the content of the modifying element(s) is too small, a modifying effect as described above is not obtained. On the other hand, if the content of the modifying element(s) is excessive, the characteristic of the lanthanoide oxide is injured.

In producing the double oxide, the following process is carried out; (a) A plurality of acetates are dissolved at a predetermined proportion into pure water. (b) An alkaline solution (e.g., a NaOH solution) is dropped into the solution obtained in step (a) to provide a value of pH equal to or greater than 9 and to hydrolyze the solution, thereby forming a precipitate. (c) The precipitate is filtered off, washed with pure water and then dried at 150° C. to provide a cake. (d) The cake is subjected to a decomposing and firing treatment in the presence of air in an electric furnace.

For example, in producing $LaCoO_3$, any of $La(OCOCH_3)_3$ and $Co(OCOCH_3)_2$ is employed as an acetate, and the firing temperature is set at 700° C., while the firing time is set at 5 hours.

To calculate the crystallite grain size $D_{(hkl)}$, Sherrer expression, $D_{(hkl)} = 0.9\lambda/(\beta_{1/2} \cdot \cos\theta)$ was used, wherein hkl is a Miller index; $\lambda$ is a wavelength (Å) of a characteristic X-ray; $\beta_{1/2}$ is a half width (radian) of a (hkl) face; and $\theta$ is an X-ray reflection angle. Therefore, the grain size $D_{(111)}$ of each of the crystallites was calculated by measuring a half width $\beta_{1/2}$ of a (hkl) face, e.g., a (111) face in cerium oxide ($CeO_2$) from an X-ray diffraction pattern for the oxide-based ceramics, and an average crystallite grain size D was determined from the calculated grain sizes $D_{(111)}$.

B. Exhaust emission control catalyst

A catalyst is basically formed of an oxide-based ceramics and a zeolite.

When a lanthanoide oxide or a modified lanthanoide oxide is used as an oxide-based ceramics, the content C thereof is set in a range of 10% by weight $\leq C \leq 80\%$ by weight. When a double oxide is used, the content C thereof is set in a range of 20% by weight $\leq C \leq 80\%$ by weight. When a mixture of a lanthanoide oxide and a double oxide is used, the content C thereof is set in a range of 20% by weight $\leq C \leq 80\%$ by weight, and the contents $C_1$, $C_2$ of the lanthanoide oxide and the double oxide are set in a range of $C_1$, $C_2 \geq 10\%$ by weight.

The zeolite which may be used are ZSM-5 zeolite, mordenite and the like. Either modified or unmodified zeolite can be used, but modified zeolite resulting from the removal of Al or the dealuminization has a heat-resisting temperature on the order of 1,000° C., and exhibits an excellent HC adsorbing ability in a wider temperature range.

At least one of an acid treatment, a steam treatment and a boiling-water treatment may be utilized as the dealuminizing treatment.

The acid treatment is carried out according to a following procedure; (a) An unmodified zeolite is thrown into a treating vessel filled with water, and 12N (norm) hydrochloric acid (HCl) is gradually added. The mixture is heated to provide a 5N HCl solution at 90° C. (b) The unmodified zeolite is maintained at this temperature for 20 hours, and at the same time, the HCl solution is agitated. In this case, a cooling tower is mounted to the treatment vessel to maintain the concentration of the HCl solution at 5N. (c) The 5N HCl solution is cooled down to room temperature. (d) The thus-obtained modified zeolite is filtered off and rinsed with pure water until the pH value reaches 4 or more, and then, the resulting zeolite is dried at 400° C. for 24 hours.

Another acid treatment employs a procedure which involves the steps of heating a 0.5 to 5N HCl solution to 70 to 90 ° C., throwing a unmodified zeolite into the HCl solution, and agitating the mixture for 1 to 20 hours.

The boiling treatment employs a procedure which involves the steps of subjecting an unmodified zeolite to a hydrating treatment, rising the temperature of an atmosphere surrounding the hydrated unmodified zeolite to 550° to 600° C., and maintaining the unmodified zeolite in the high-temperature atmosphere for about 4 hours.

Further, the steam treatment employs a procedure which involves the steps of maintaining an unmodified zeolite for 10 to 20 hours in an atmosphere having a temperature in a range of 750° to 900° C. and containing water in an amount on the order of 10%.

Any one or two of the acid treatment, the boiling-water treatment and the steam treatment may be utilized alone or in combination, and may be repeated if required. In this manner, the modified zeolite is produced. The molar ratio Mr of $SiO_2/Al_2O_3$ in the modified zeolite is suitably in a range of 36 to 800.

A zeolite having Ag borne or carried therein may be used. The content CA of Ag borne is set in a range of 1% by weight $\leq CA \leq 10\%$ by weight. The zeolite having Ag borne or carried therein exhibits a high ability of adsorbing unsaturated hydrocarbon (HC), and active CHO having a high NO-reducing ability is easily produced from the unsaturated hydrocarbon (HC). Therefore, the zeolite having Ag carried therein is effective for increasing the NO conversion rate. A method for bearing or carrying Ag in the zeolite, which may be used, is an impregnation bearing or carrying process, an ion exchange process or the like.

Embodiment

The following test was carried out for the NO adsorbing ability of cerium oxide ($CeO_2$) as the lanthanoide oxide.

First, a test gas was prepared which has a composition comprising 10% of $O_2$, 10% of $CO_2$, 1200 ppm of $C_3H_6$, 1000 ppm of CO, 1200 ppm of NO, 500 ppm of $H_2$, 10% of $H_2O$ and the balance of $N_2$, all by volume. A plurality of cerium oxides ($CeO_2$) having different average crystallite grain sizes D were also prepared.

The NO adsorption teat was carried out in a following manner. The test gas was forced to flow at a flow rate of 25,000 ml/min through an ambient-pressure fixed-bed reaction tube filled with 20 g of pellets of cerium oxide ($CeO_2$), and the temperature of the test gas was risen from ambient temperature to 400° C. at the rate of 15° C./min and during this time, the amount (ml) of NO adsorbed per g of cerium oxide ($CeO_2$) was determined.

Table 1 shows the average crystallite grain size D and the amount of NO adsorbed for examples 1 to 7 of the cerium oxide ($CeO_2$).

TABLE 1

| Example No. of $CeO_2$ | Average crystalline grain size D (Å) | Amount of NO adsorbed (ml/g) |
| --- | --- | --- |
| 1 | 21 | 1.10 |
| 2 | 96 | 1.08 |
| 3 | 212 | 0.99 |
| 4 | 308 | 0.92 |

TABLE 1-continued

| Example No. of $CeO_2$ | Average crystalline grain size D (Å) | Amount of NO adsorbed (ml/g) |
| --- | --- | --- |
| 5 | 385 | 0.81 |
| 6 | 470 | 0.68 |
| 7 | 542 | 0.13 |

Figure 2:
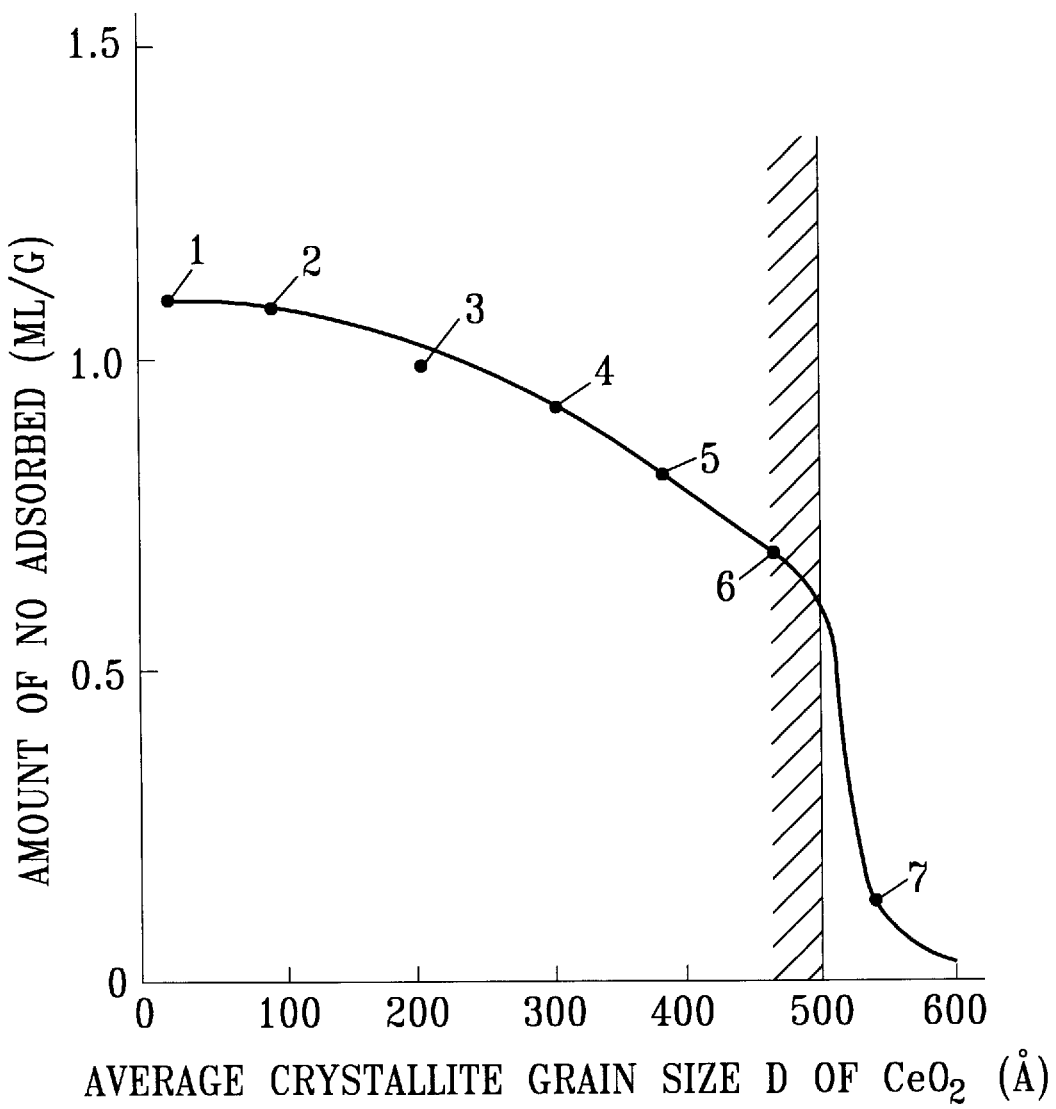
FIG. 2 is a graph showing the relationship between the average crystallite grain size of cerium oxide ($CeO_2$) and the amount of nitrogen oxide (NO) absorbed.

FIG. 2 is a graph taken by plotting the relationship between the average crystallite grain size D of cerium oxide ($CeO_2$) and the amount of NO adsorbed in Table 1. In FIG. 2, points 1 to 7 correspond to examples 1 to 7. The relationship between each of the points and each of the examples applies hereinafter.

It can be seen from FIG. 2 that examples 1 to 6 having an average crystallite grain size D of cerium oxide ($CeO_2$) set in a range of D<500 Å have an excellent No absorption ability, as compared to the example 7 which has an average crystalline grain size a>500 Å. The average crystallite grain size D of cerium oxide ($CeO_2$) is preferably in a range of $D \geq 300$ Å.

Figure 3:
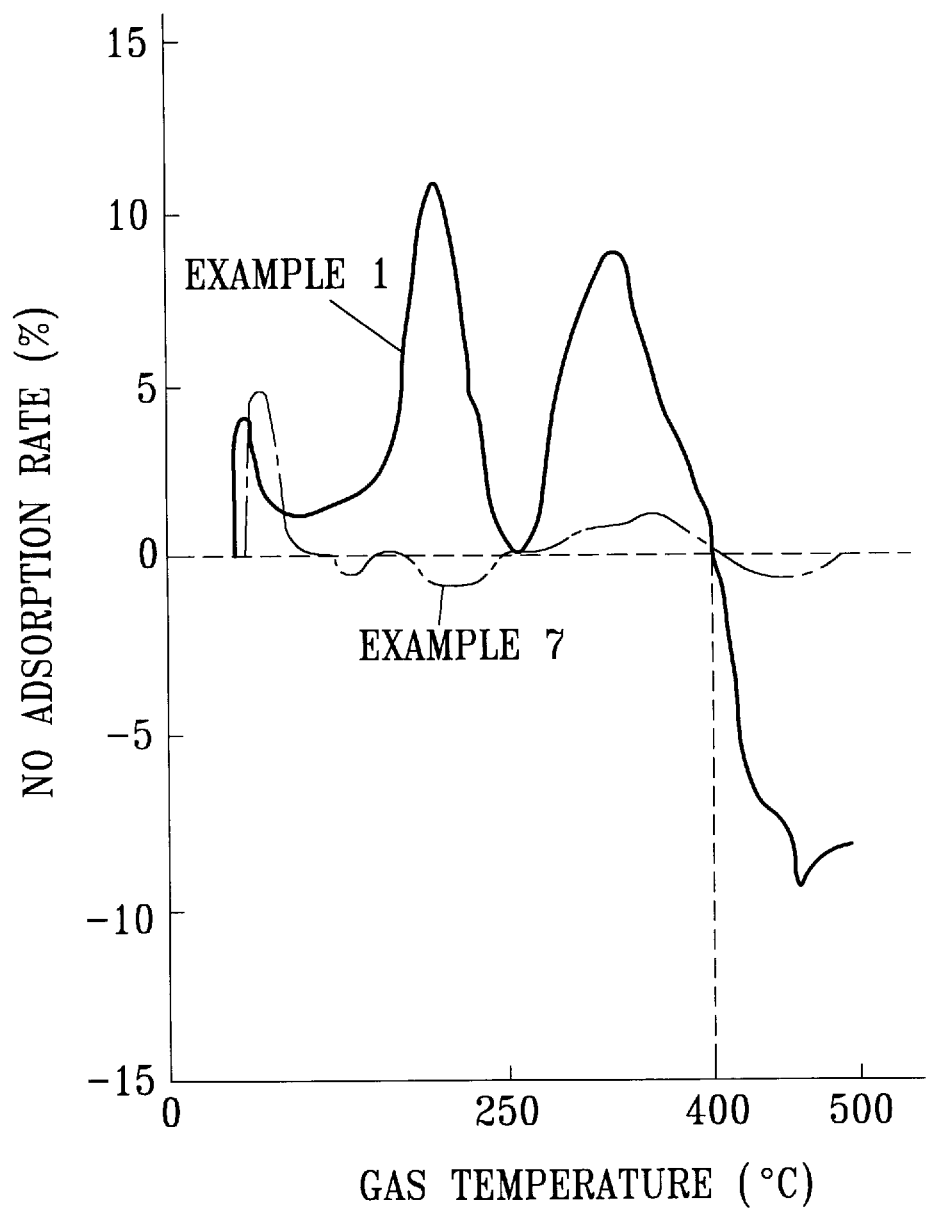
FIG. 3 is a graph showing the relationship between the gas temperature and the NO absorption rate.

In the NO adsorbing test using the examples 1 and 7, the temperature of the test gas was risen from room temperature to 500° C. at the rate of 15° C./min, and during this time, the NO absorption rate was measured to provide results shown in FIG. 3.

In FIG. 3, a region where the NO absorption rate has negative values indicates the fact that NO adsorbed to the $CeO_2$ is desorbed from the $CeO_2$. Therefore, it can be seen that the temperature permitting NO to be desorbed from $CeO_2$ is about 400° C.

Thus, it is possible to form an exhaust emission control catalyst that effectively utilizes the NO-concentrating ability of cerium oxide ($CeO_2$) by combining the example 1 of $CeO_2$ with a catalyst exhibiting an NO-reducing ability in a gas temperature range of 300° to 500° C., e.g., a catalyst with Pt carried in $Al_2O_3$.

Embodiment

An exhaust emission control catalyst in this embodiment is formed of cerium oxide ($CeO_2$) having an average crystallite grain size in a range of D<500 Å and zeolite. The content C of cerium oxide ($CeO_2$) is set in a range of 10% by weight $\leq C \leq 80\%$ by weight.

The zeolites used are an unmodified B-type ZSM-5 zeolite having a molar ratio Mr of $SiO_2/Al_2O_3$ equal to 30, and a modified zeolite resulting from the dealuminization of such an unmodified H-type ZSM-5 zeolite and having a molar ratio equal to 36 (a dealuminization rate of 12%).

The catalyst was produced in the following manner. First, cerium oxide ($CeO_2$) having a predetermined average crystallite grain size D and a zeolite of the above-described type were mixed at a predetermined proportion by weight. 50 g of such mixture, 100 g of 10 mm diameter alumina balls, 25 g of silica sol (containing 20% by weight of $SiO_2$), and 50 g of water were placed into a ball mill and mixed together for 12 hours or more. Then, the resulting mixture is dried at 150° C. and then subjected to a firing for 20 hours at 400° C. to produce a pellet-like catalyst.

For comparison, a $Pt/Al_2O_3$ catalyst was produced in the following manner. 50 g of commercially available active $Al_2O_3$, 100 g of the same type of alumina balls, 25 g of the same type of silica sol, and 50 g of water were placed into a ball mill and mixed together for 12 hours or more. Then, the mixture was dried at 150° C. and then subjected to a firing at 400° C. for 20 hours to produce a pellet-like catalyst. These pellets were immersed in 90 ml of a platinic chloride solution (Pt concentration=0.35%) for 20 hours, whereby the platinic chloride was borne or carried in the pellets in the impregnated manner. Then, the pellets were filtered off, rinsed with pure water, dried at 150° C. and fired at 600° C. for 1 hour to provide a $Pt/Al_2O_3$ catalyst. The amount of Pt carried in this catalyst was of 0.53% by weight.

The NO absorption test was carried out by forcing a test gas having the same composition as that described above to flow at a flow rate of 25,000 ml/min through an ambient-pressure fixed-bed reaction tube filled with 20 g of the catalyst, and rising the temperature of the test gas from ambient temperature to about 570° C. at the rate of 15° C./min while measuring the NO conversion rate.

Table 2 shows the composition of each of various catalysts. In this case, the average crystallite grain size D is equal to 21 Å. In Table 2, the term of "modified ZSK-5" means a modified H-type ZSM-5 zeolite. This applies in the description made hereinafter.

TABLE 2

| Catalyst example No. | Composition (% by weight) | |
|---|---|---|
| | $CeO_2$ | Modified ZSM-5 |
| 1 | 0 | 100 |
| 2 | 10 | 90 |
| 3 | 30 | 70 |
| 4 | 50 | 50 |
| 5 | 70 | 30 |
| 6 | 80 | 20 |
| 7 | 90 | 10 |
| 8 | 100 | 0 |

Figure 4:
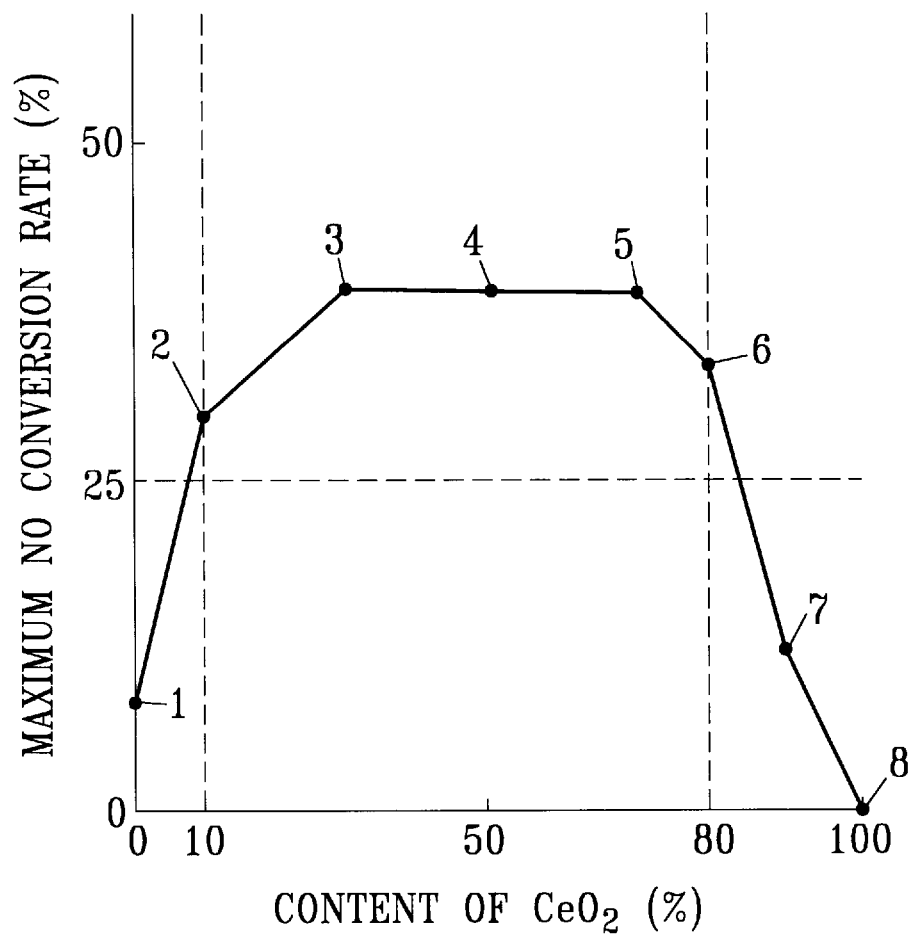
FIG. 4 is a graph showing the relationship between the content of $Ceo_2$ and the maximum No conversion rate.

FIG. 4 is a graph showing the relationship between the content of cerium oxide ($CeO_2$) and the maximum NO conversion rate for catalyst examples 1 to 8. In this NO conversion test, a maximum NO conversion rate equal to or greater than 25% is satisfactory and thus, the cerium oxide ($CeO_2$) content is set in a range of 10% by weight $\leq C \leq 80\%$ by weight, as in the examples 2 to 6.

Table 3 shows the composition of each of the various catalysts, the average crystallite grain size D of cerium oxide ($CeO_2$), and the NO conversion rate. Table 3 also includes examples 1, 3 to 5 and 8 given in Table 2. In Table 3, the term of "unmodified ZSM-5" means an unmodified Na-type ZSM-5 zeolite. This applies hereinafter.

TABLE 3

| Catalyst example No. | Composition (by % weight) | | | Average crystalline grain size of $CeO_2$ D (Å) | NO conversion rate (%) | | |
|---|---|---|---|---|---|---|---|
| | $CeO_2$ | Modified ZSM-5 | Unmodified ZSM-5 | | 300° C. | 400° C. | 500° C. |
| 3 | 30 | 70 | — | 21 | 18 | 27 | 39 |
| 4 | 50 | 50 | — | 21 | 18 | 32 | 39 |
| 5 | 70 | 30 | — | 21 | 21 | 37 | 39 |
| 9 | 50 | 50 | — | 123 | 16 | 31 | 37 |
| 10 | 50 | 50 | — | 205 | 13 | 25 | 30 |
| 11 | 50 | 50 | — | 316 | 10 | 17 | 17 |
| 12 | 50 | — | 50 | 21 | 16 | 22 | 29 |
| 1 | — | 100 | — | — | 5 | 9 | 8 |
| 8 | 100 | — | — | 21 | 7 | 0 | 8 |
| 13 | 50 | 50 | — | 542 | 2 | 7 | 7 |
| 14 | | $Pt/Al_2O_3$ | | — | 12 | 4 | 0 |

Figure 5:
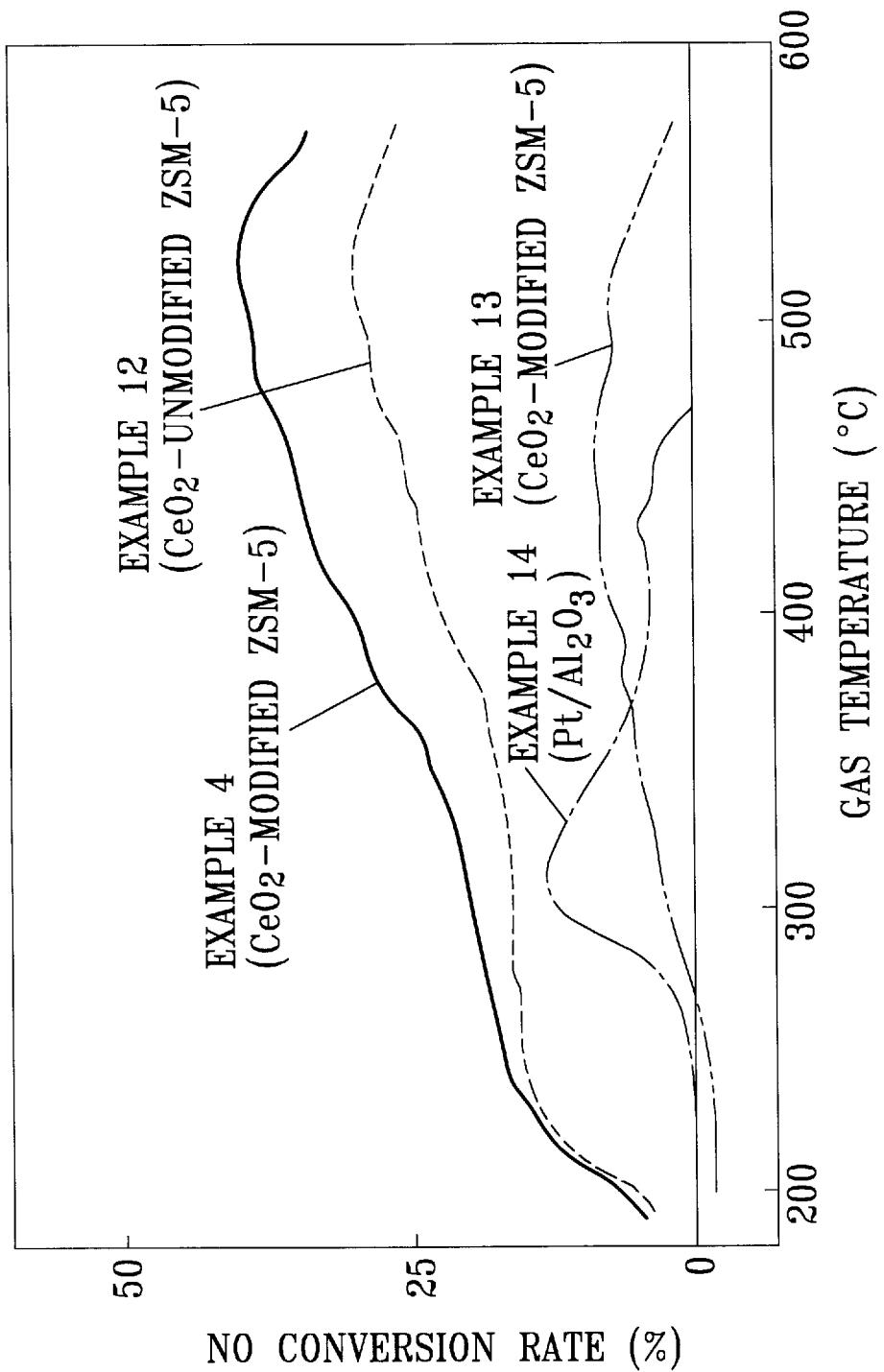
FIG. 5 is a first example of a graph showing the relationship between gas temperature and the NO conversion rate.

FIG. 5 shows the relationship between the NO conversion rate and the gas temperature for the catalyst examples 4 and 12 to 14.

As can be seen from FIG. 5 and Table 3 that the NO conversion rate exhibited at each temperature by each of examples 3 to 5 and 9 to 12 is higher than those exhibited by the comparative examples 1, 8, 13 and 14 of catalysts.

Figure 6:
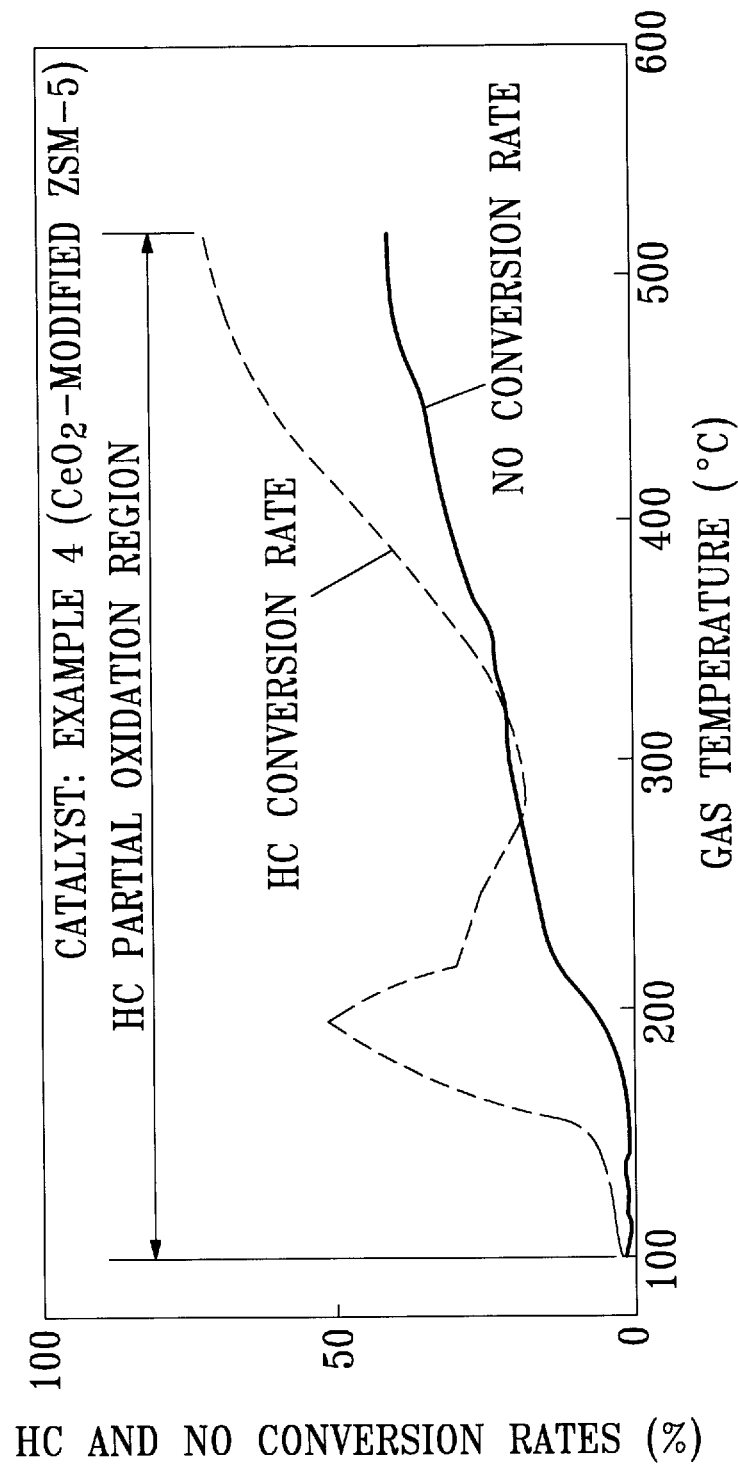
FIG. 6 is a first example of a graph showing the relationship between the gas temperature and the conversion rates for hydrocarbon (HC) and nitrogen oxide (NO)

FIG. 6 shows the relationship between the gas temperature and the NO conversion rate for the catalyst example 4. In FIG. 6, the conversion of hydrocarbon (HC) is mainly attributable to the adsorption of hydrocarbon (HC) by the modified H-type ZSM zeolite. Accordingly, the adsorption of hydrocarbon (HC) by such zeolite and the production of active CHO by the partial oxidization of the HC are achieved in a wide range of temperatures. As a result, the NO conversion rate is increased with rising of the gas temperature.

Figure 7:
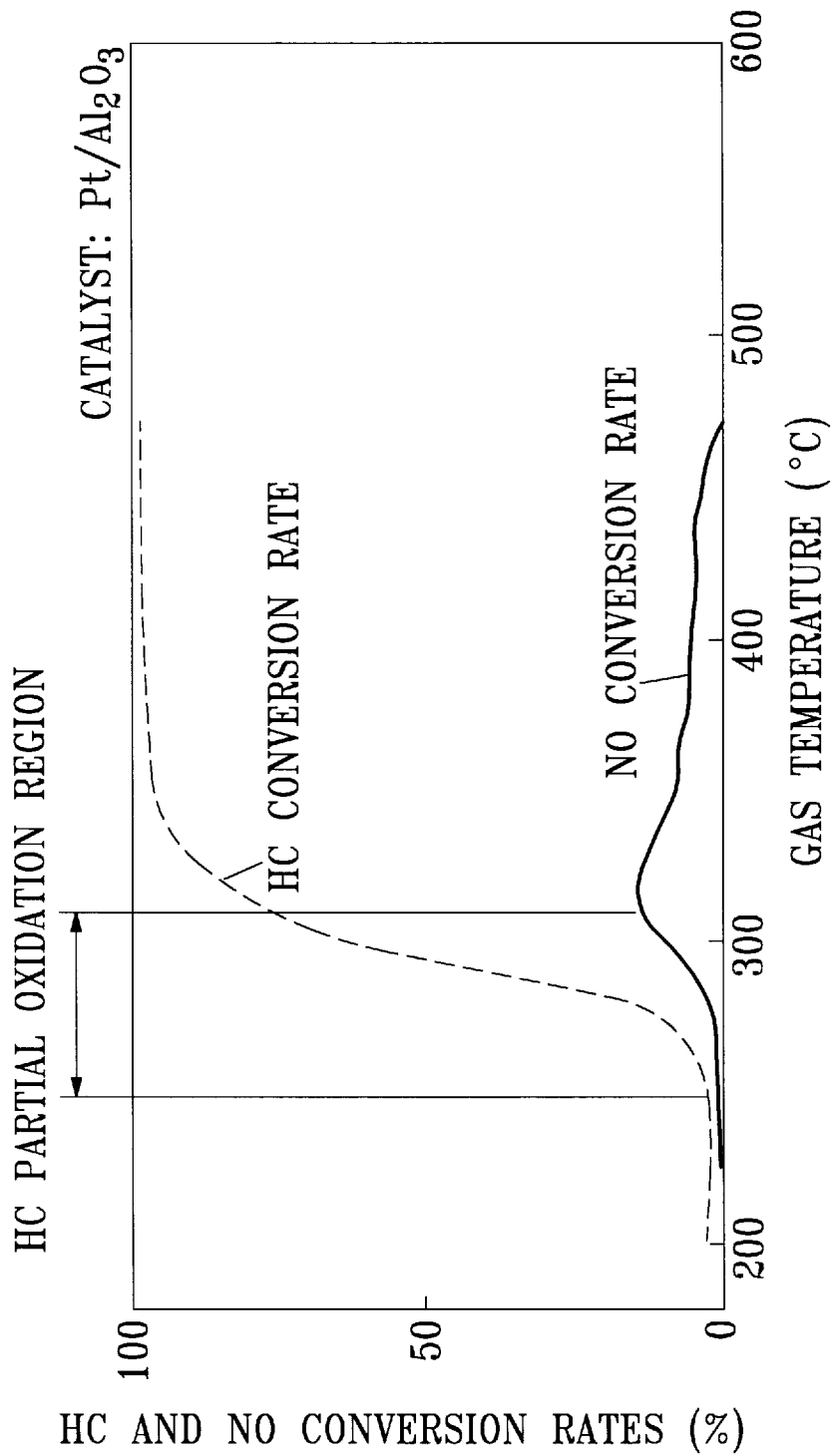
FIG. 7 is a second example of a graph showing the relationship between the gas temperature and the conversion rates for hydrocarbon (HC) and nitrogen oxide (NO)

FIG. 7 shows the relationship between the gas temperature and the hydrocarbon (HC) and NO conversion rates for the catalyst example 14. The conversion of RC in a gas temperature range of about 250 to about 300° C. in FIG. 7 is attributable to the adsorption of HC by the $Pt/Al_2O_3$ catalyst and the partial oxidization of HC. As a result, the NO conversion rate is increased. However, if the gas temperature exceeds 300° C., the complete oxidization of HC, i.e., a chemical reaction represented by $HC \rightarrow H_2O + CO_2$, primarily advances. For this reason, the production of active CHO is extremely decreased with the declination of the partial oxidizing reaction, resulting in a lowered NO conversion rate.

Embodiment

An example of an exhaust emission control catalyst according to this embodiment is formed from a zeolite and $LaCoO_3$ having an average crystallite grain size in a range of D<500 Å. The content C of $LaCoO_3$ is set in a range of 20% by weight $\leq C \leq 80\%$ by weight.

Another example of an exhaust emission control catalyst includes Pt borne in $LaCoO_3$. In this case, the amount CA of Pt borne is set in a range of 0.01% by weight ≦CA≦0.5% by weight. Pt has an effect of promoting the partial oxidization of hydrocarbon (HC) in an exhaust gas temperature of about 250 to about 350° C. If the amount CA of Pt carried is lower than 0.01% by weight, such an effect cannot be achieved. On the other hand, if CA >0.5% by weight, a complete oxidation reaction of hydrocarbon (HC) will advance.

The method of bearing Pt in LaCoO₃ is to immerse LaCoO₃ into a platinic chloride solution and then fire the resulting material at 600° C., or to add a platinate to the a starting oxide LaCoO₃ and then fire the resulting material. In this example, LaCoO₃ with 0.03% by weight of Pt borne therein was used.

Using the modified H-type ZSM-5 zeolite and the unmodified H-type ZSM-5 zeolite employed in the embodiment, LaCoO₃ and Pt/LaCoO₃, various pellet-like catalysts were produced in the same manner as in the embodiment. These catalysts were subjected to an NO conversion test similar to that in the embodiment.

Table 4 shows the composition of each of various catalysts. In this case, the average crystal-line grain size D of LaCoO₃ is equal to 490 Å.

TABLE 4

| Catalytic example | Composition (% by weight) | |
| --- | --- | --- |
| No. | LaCoO₃ | Modified ZSM-5 |
| 1 | 0 | 100 |
| 2 | 10 | 90 |
| 3 | 20 | 80 |
| 4 | 30 | 70 |
| 5 | 40 | 60 |
| 6 | 50 | 50 |
| 7 | 70 | 30 |
| 8 | 80 | 20 |
| 9 | 90 | 10 |
| 10 | 100 | 0 |

Figure 8:
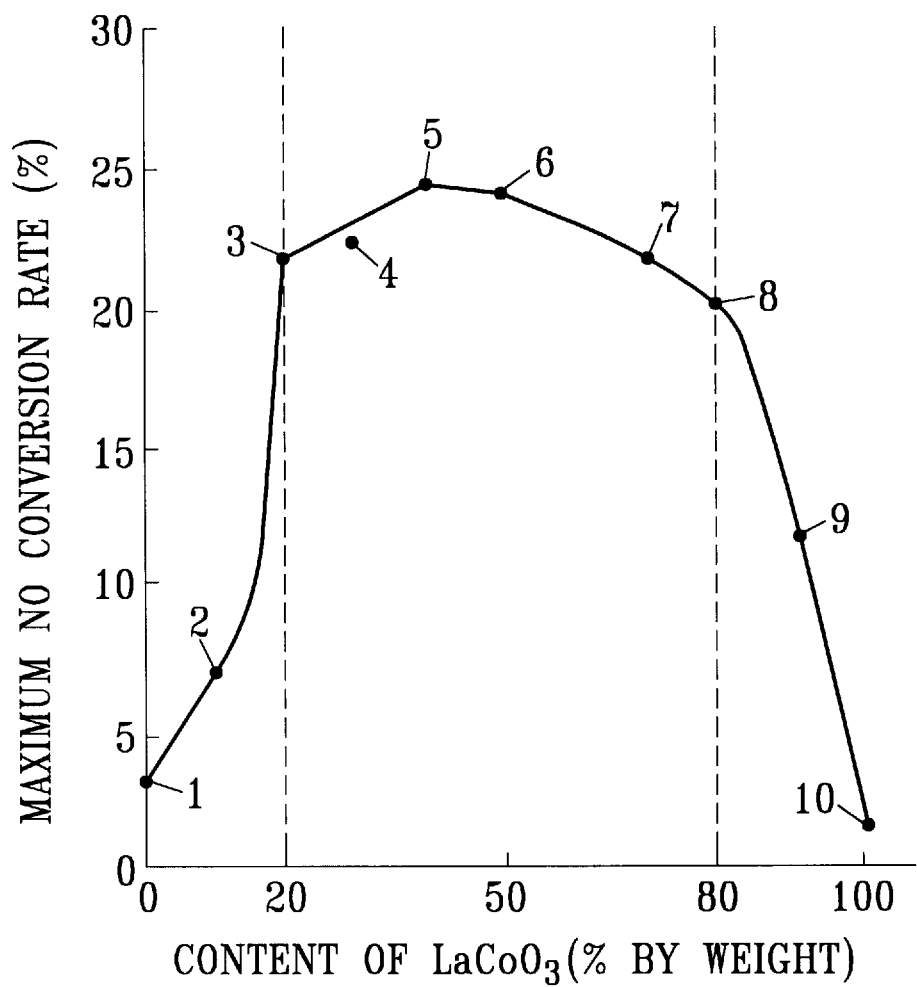
FIG. 8 is a graph showing the relationship between the content of $LaCoO_3$ and the maximum NO conversion rate.

FIG. 8 shows the relationship between the LaCoO₃ content and the minimum No conversion rate in the NO conversion test for the examples 1 to 10 of catalysts. A maximum NO conversion rate equal to or greater than 20% in the NO conversion test is satisfactory and accordingly, the content C of LaCoO₃ is set in a range hereof 20% by weight ≦C≦80% by weight, as in examples 3 to 8.

Table 5 shows the composition of each of various catalysts and the NO conversion rates at different temperatures. Table 5 includes the example 5 given in Table 4 and for the sake of comparison, also includes the above-described catalyst Pt/Al₂O₃ as a comparative example 13.

Figure 9:
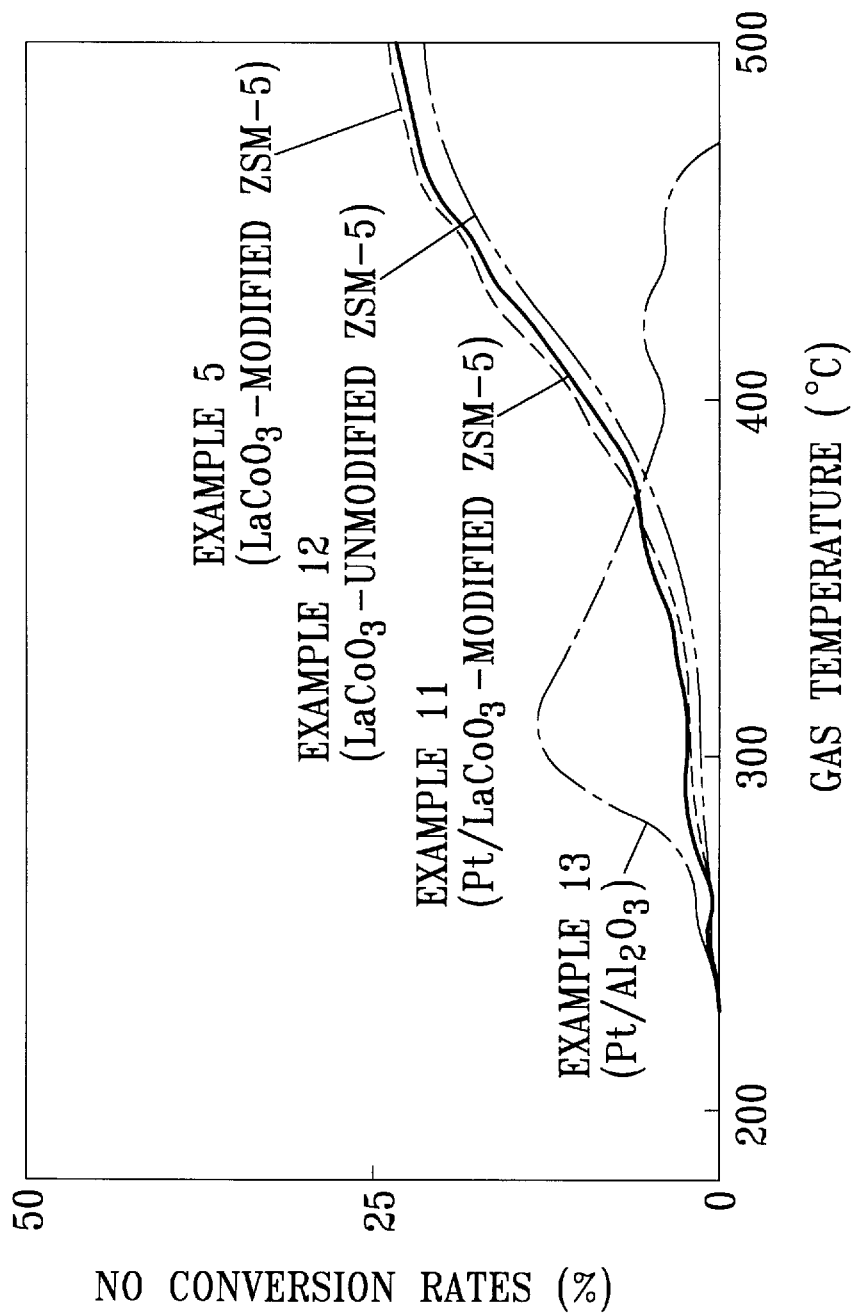
FIG. 9 is a second example of a graph showing the relationship between the gas temperature and the No conversion rate.

FIG. 9 shows the relationship between the gas temperature and the NO conversion rate for the catalytic examples 5, 11, 12, 13.

It can be seen from Table 5 and FIG. 9 that NO conversion rate exhibited at each of the temperatures by the examples 5 to 12 is higher than those exhibited by the comparative example 13.

Figure 10:
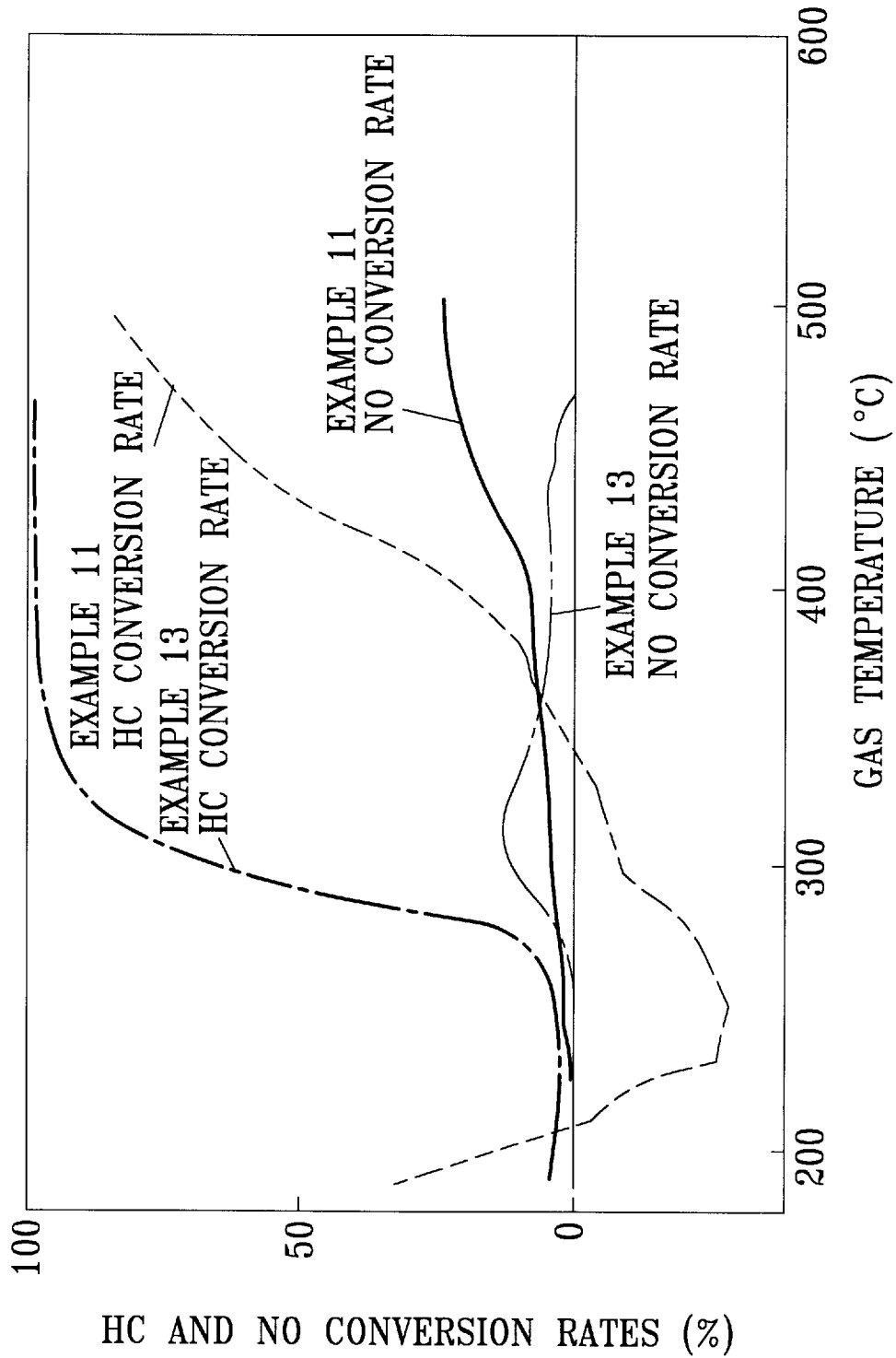
FIG. 10 is a third example of a graph showing the relationship between the gas temperature and the HC and NO conversion rates.

FIG. 10 shows the relationship between the gas temperature and the hydrocarbon (HC) and NO conversion rates for the catalyst example 11. For comparison, hydrocarbon (HC) and NO conversion rates for the example 13 (Pt/Al₂O₃) are given in FIG. 10.

It can be seen from FIG. 10 that for the catalyst example 11, the adsorption of HC by the modified H-type ZSM-5 zeolite and the production of active CHO by the partial oxidation are performed in the wide gas temperature range, and as a result, the NO conversion rate is increased with rising of the gas temperature.

Embodiment

An example of an exhaust emission control catalyst according to the embodiment 4 of the present invention comprises a mixture of cerium oxide (CeO₂) having an average crystalline grain size D<500Å and LaCoO₃ having a similar average crystalline grain size D, and a zeolite. The content C of the mixture is set in a range of 20% by weight ≦C≦80% by weight. The contents C1 and C2 of cerium oxide (CeO₂) and LaCoO₃ are set equal to or greater than 10% by weight.

Another example of an exhaust emission control catalyst includes LaCoO₃ with platinum (Pt) borne or carried therein, as does example 3. The content CA of Pt borne is set in a range of 0.01% by weight ≦CA≦0.5% by weight.

Various pellet-like catalysts were produced using the modified N-type ZSM-5 zeolite used in the embodiment, cerium oxide (CeO₂), LaCoO₃ and Pt/LaCoO₃. Then, the catalysts were subjected to an NO conversion test in the same manner as in the embodiment.

Figure 11:
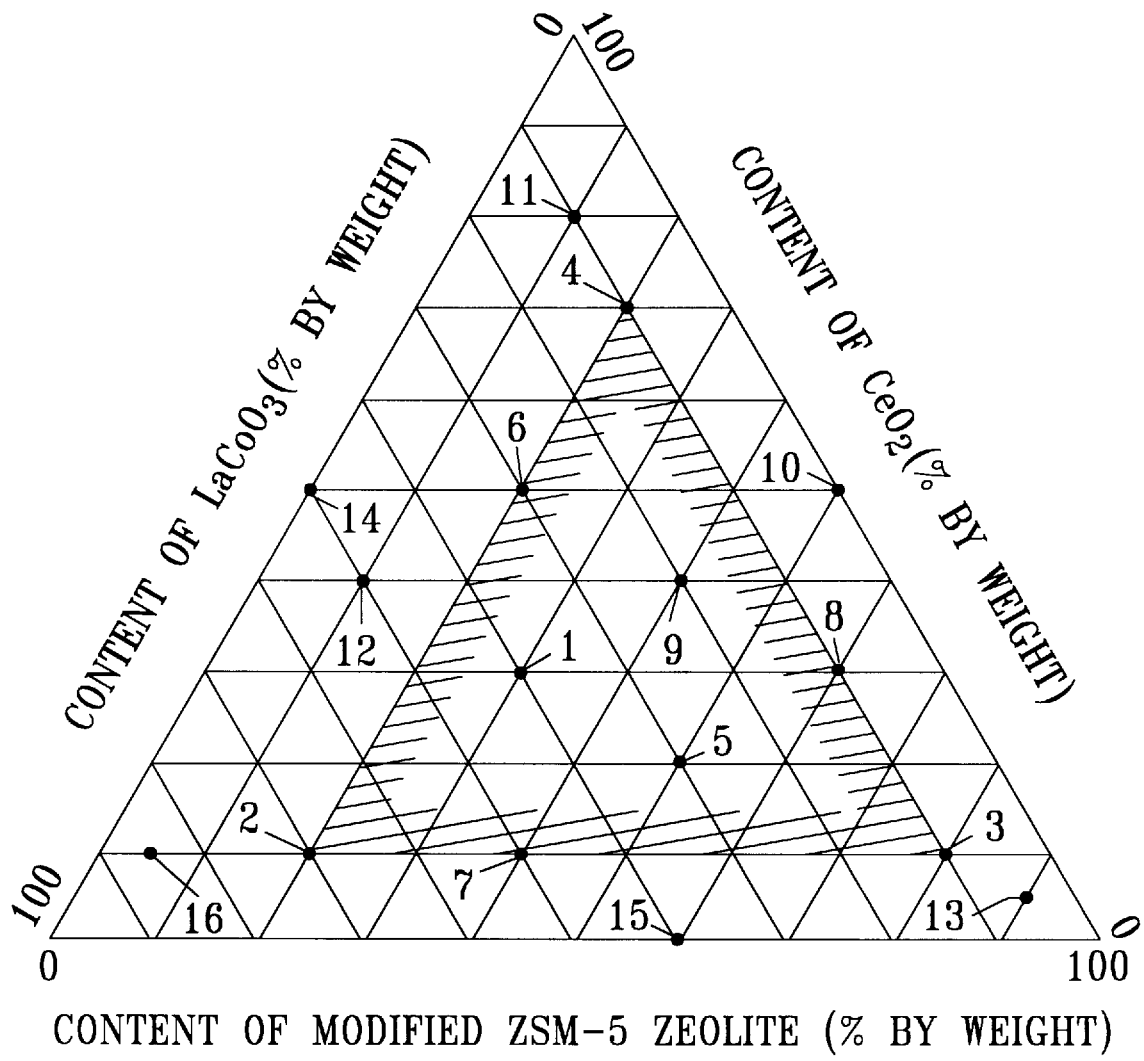
FIG. 11 is a graph showing the contents of components forming the catalyst.

Table 6 shows the composition of each of the various catalysts and the maximum NO conversion rate. FIG. 11 is a graph showing the compositions shown in Table 6. In this case, CeO₂ has an average crystalline grain size D equal to 21 Å, and LaCoO₃ has an average crystalline grain size D equal to 490 Å.

TABLE 5

| Catalyst example No. | Composition (by % weight) | | | | NO conversion rate (%) | | |
| --- | --- | --- | --- | --- | --- | --- | --- |
| | LaCoO₃ | Pt/LaCoO₃ | Modified ZSM-5 | Unmodified ZSM-5 | 300° C. | 400° C. | 500° C. |
| 5 | 40 | — | 60 | — | 3 | 90 | 23 |
| 11 | — | 40 | 60 | — | 2 | 10 | 24 |
| 12 | 40 | — | — | 60 | 2 | 8 | 21 |
| 13 | | Pt/Al₂O₃ | | | 12 | 4 | 0 |

TABLE 6

| Catalyst example No. | Composition (by % weight) | | | Maximum NO conversion rate (%) |
|---|---|---|---|---|
| | $CeO_2$ | $LaCoO_3$ | Modified ZSM-5 | |
| 1 | 30 | 40 | 30 | 41 |
| 2 | 10 | 70 | 20 | 42 |
| 3 | 10 | 10 | 80 | 41 |
| 4 | 70 | 10 | 20 | 44 |
| 5 | 20 | 30 | 50 | 40 |
| 6 | 50 | 30 | 20 | 41 |
| 7 | 10 | 50 | 40 | 41 |
| 8 | 30 | 10 | 60 | 43 |
| 9 | 40 | 20 | 40 | 45 |
| 10 | 50 | 0 | 50 | 26 |
| 11 | 80 | 10 | 10 | 18 |
| 12 | 40 | 50 | 10 | 21 |
| 13 | 5 | 5 | 90 | 17 |
| 14 | 50 | 50 | 0 | 2 |
| 15 | — | 40 | 60 | 23 |
| 16 | 10 | 85 | 5 | 6 |

A maximum NO conversion rate equal to or greater than 40% is satisfactory in this NO conversion test and accordingly, from Table 6 and FIG. 11, the content C of the mixture is set in a range of 20% by weight $\leq C \leq 80\%$ by weight; the content $C_1$ of $CeO_2$ is set in a range of $C_1 \geq 10\%$ by weight; and the content $C_2$ of $LaCoO_3$ is set in a range of $C_2 \geq 10\%$ by weight, as in examples 1 to 9.

Figure 12:
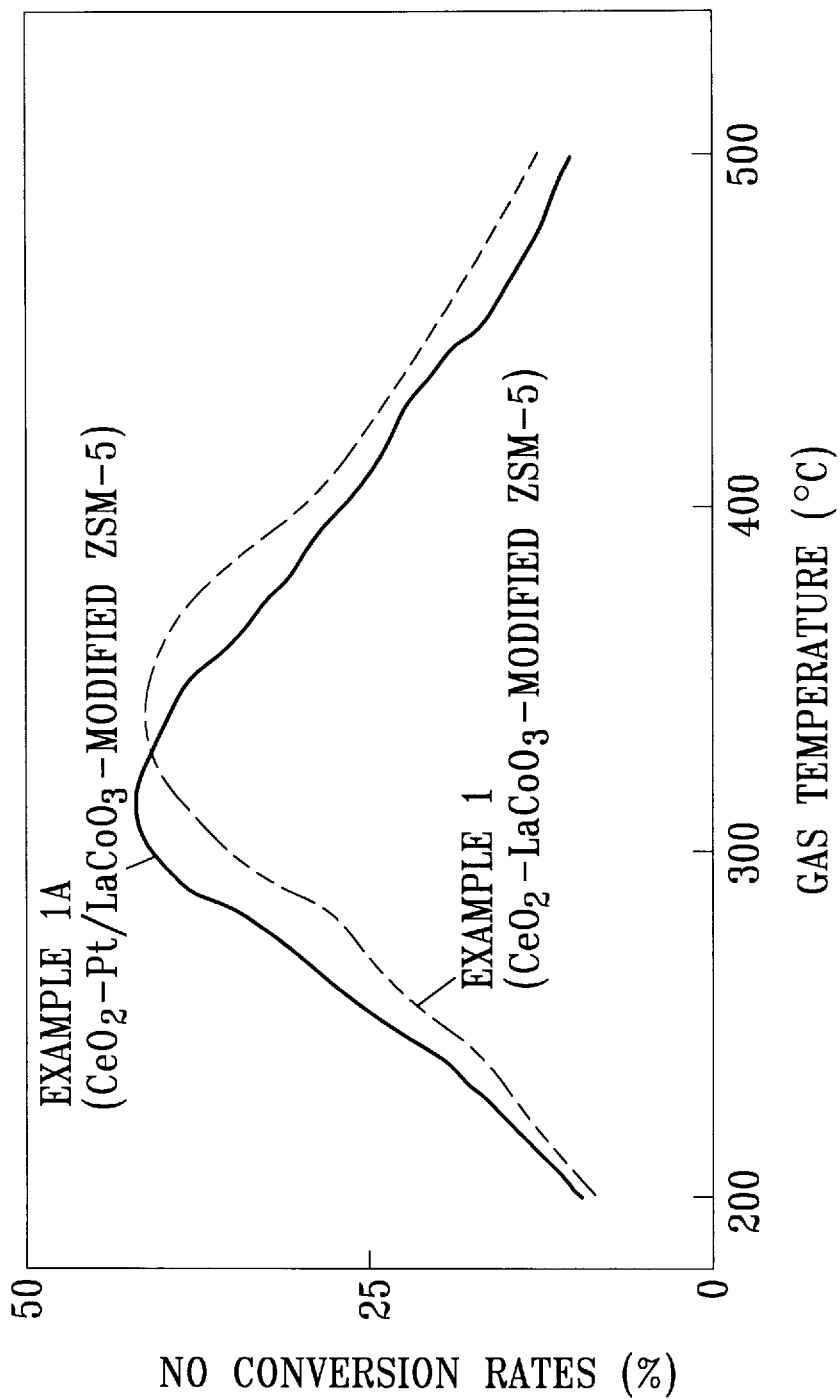
FIG. 12 is a third example of a graph showing the relationship between the gas temperature and the NO conversion rate.

FIG. 12 shows the relationship between the gas temperature and the NO conversion rate for examples 1 and 1a. In the example 1a, the same amount of $Pt/LaCoO_3$ as in example 1 with 0.03% by weight of Pt borne therein was used.

As apparent from FIG. 12, if $Pt/LaCoO_3$ is used as in the example 1a, there is a shift in the maximum NO conversion rate to a lower temperature range, as compared with example 1. Accordingly, it is possible to enhance the NO conversion ability in a lower temperature range.

Figure 13:
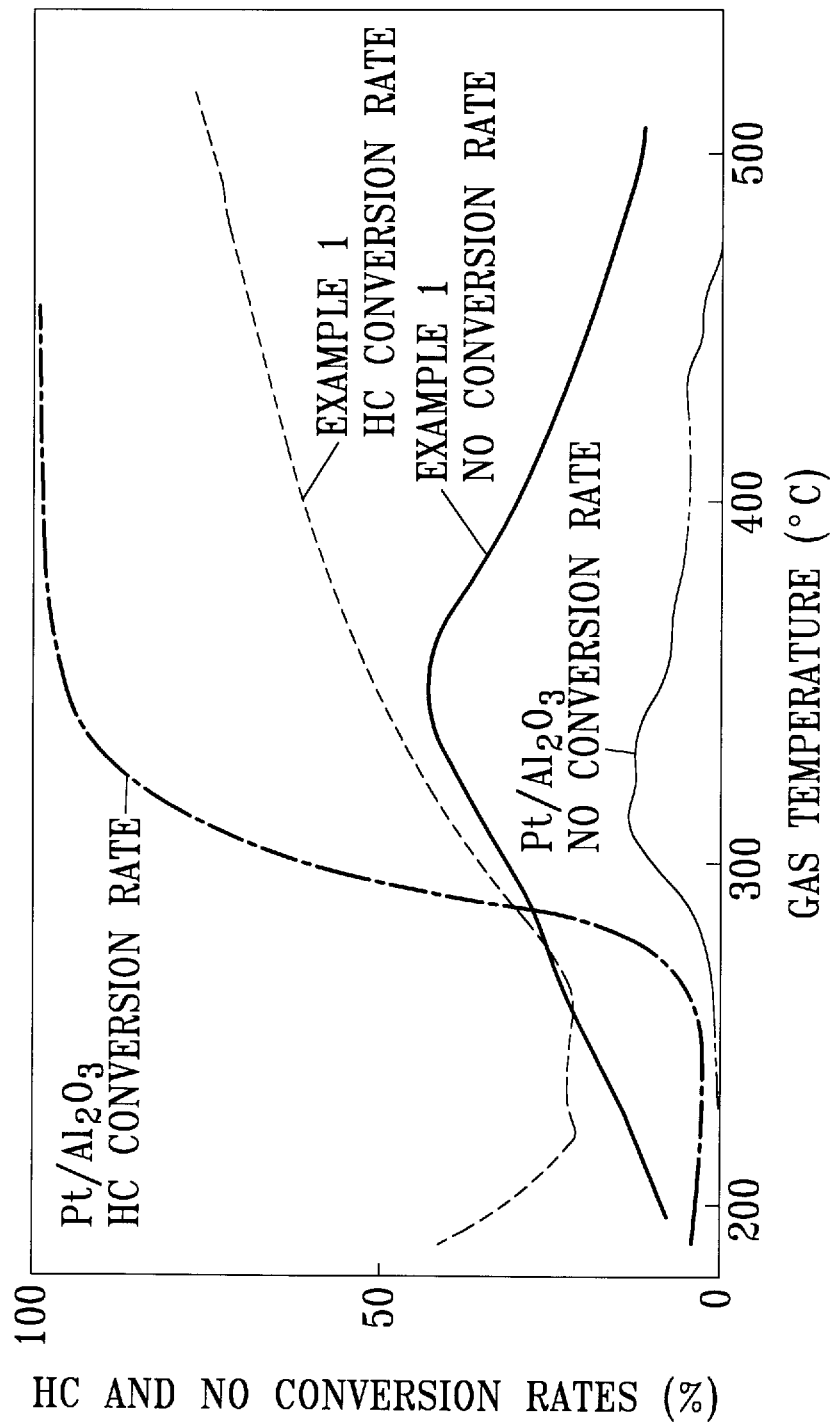
FIG. 13 is a fourth example of a graph showing the relationship between the gas temperature and the HC and NO conversion rates.

FIG. 13 shows the relationship between the gas temperature and the hydrocarbon (HC) and NO conversion rates for the catalyst example 1. For comparison, the hydrocarbon (HC) and NO conversion rates exhibited by the above-described $Pt/Al_2O_3$ catalyst are also given in FIG. 13.

It can be seen from FIG. 13 that the adsorption of HC by the modified H-type ZSM-5 zeolite and the production of active CHO by the partial oxidation of HC are performed in the wide gas temperature range, and as a result, the NO conversion rate is increased more than the case where the $Pt/Al_2O_3$ is used.

Embodiment

An exhaust emission control catalyst in this embodiment is formed from cerium oxide ($CeO_2$) having an average crystalline grain size D<500 Å and a zeolite with Ag borne therein. The content C of $CeO_2$ is set in a range of 10% by weight $\leq C \leq 80\%$ by weight and the amount CA of Ag borne are set in a range of 1% by weight $\leq CA \leq 10\%$ by weight.

An ion exchange process was utilized as a method for bearing Ag in the zeolite. For example, a modified H-type ZSM-5 zeolite containing Ag borne in an amount of 2.2% by weight by placing 50 g of a modified H-type ZSM-5 zeolite into 0.2 mol/liter of a silver nitrate solution, agitating the resulting mixture for 18 hours at 50° C., and subjecting it to a filtering, to a washing with water and then to a firing at 400° C. for 24 hours.

Various pellet-like catalysts were produced in the same manner as in the embodiment using the modified H-type ZSM zeolite used in the embodiment, an unmodified H-type ZSM-5 zeolite with Ag borne therein and an modified H-type ZSM-5 zeolite with no Ag borne therein, and cerium oxide ($CeO_2$). These catalysts were subjected to an NO conversion test similar to that described in the embodiment.

Table 7 shows the composition of each of the various catalysts, the average crystalline grain size D of $CeO_2$ and the NO conversion rates at different temperatures.

TABLE 7

| Catalyst example No. | Composition (by % weight) | | | | Average crystalline grain size D $CeO_2$ (Å) | NO conversion rate (%) | | |
|---|---|---|---|---|---|---|---|---|
| | $CeO_2$ | Modified ZSM-5 zeolite | Unmodified ZSM-5 zeolite | Ag | | 300° C. | 425° C. | 500° C. |
| 1 | 60 | 40 | — | 2.2 | 21 | 18 | 40 | 29 |
| 2 | 60 | 40 | — | 0.8 | 316 | 18 | 32 | 27 |
| 3 | 60 | — | 40 | 1.3 | 21 | 14 | 32 | 21 |
| 4 | 60 | 40 | — | 2.2 | 542 | 3 | 14 | 10 |
| 5 | 60 | 40 | — | — | 21 | 18 | 29 | 39 |

It can be seen from Table 7 that each of examples 1 to 3 and 5 of the catalysts exhibits a higher NO conversion rate at each of the temperatures, as compared with the comparative example 4 of the catalyst.

Figure 14:
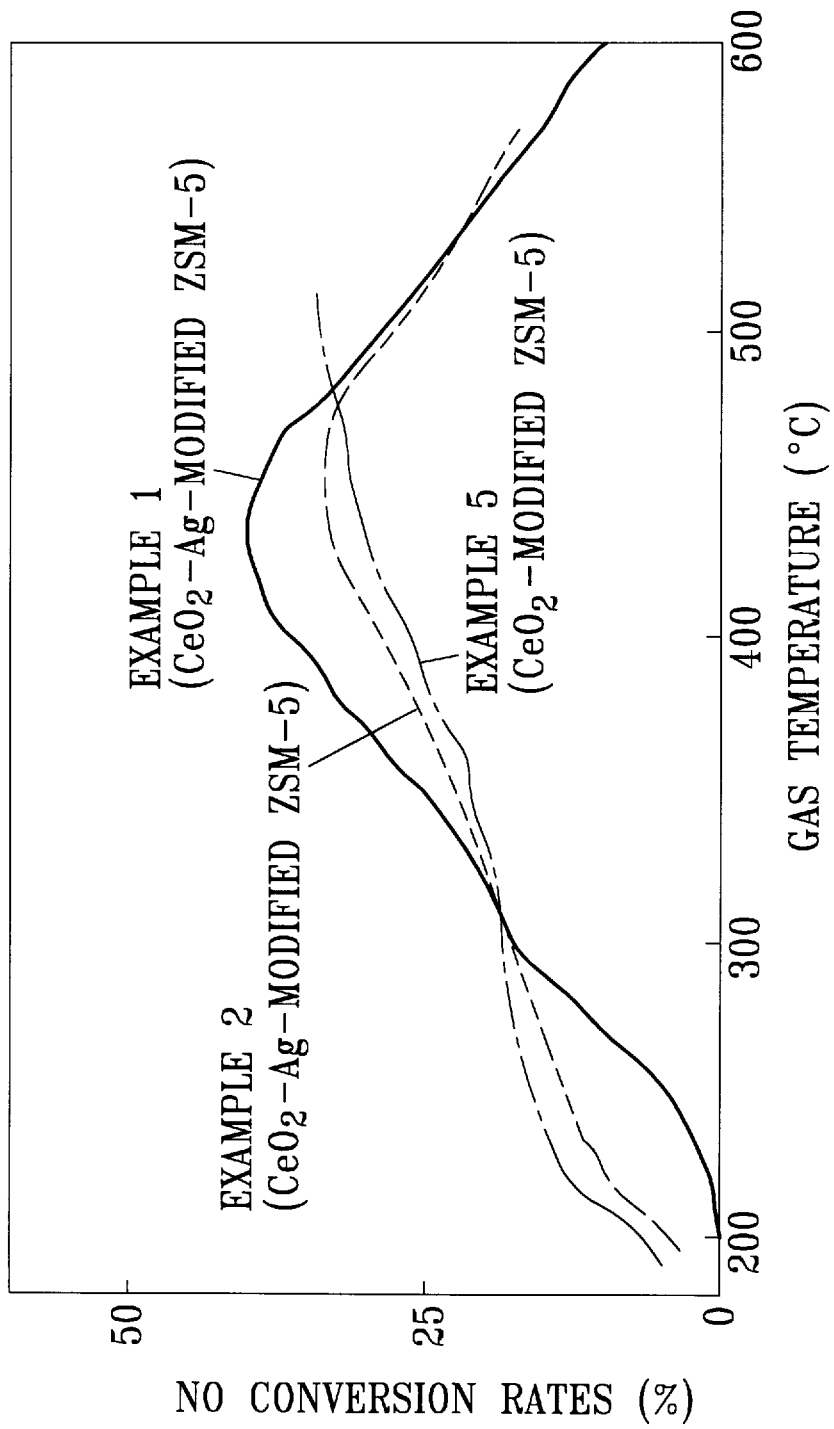
FIG. 14 is a fourth example of a graph showing the relationship between the gas temperature and the NO conversion rate.

FIG. 14 shows the relationship between the gas temperature and the NO conversion rates for the catalyst examples 1, 2, and 5. Examples 1 and 2 shows a maximum NO conversion rates in a gas temperature range between 400° C. and 500° C. due to the bearing of Ag. On the other hand, for example 5, the NO conversion rate is increased with rising of the gas temperature. Thus, it is possible to form a catalyst which exhibits an NO conversion ability in a wide gas temperature range by combining each of examples 1 and 2 with example 5.

Figure 15:
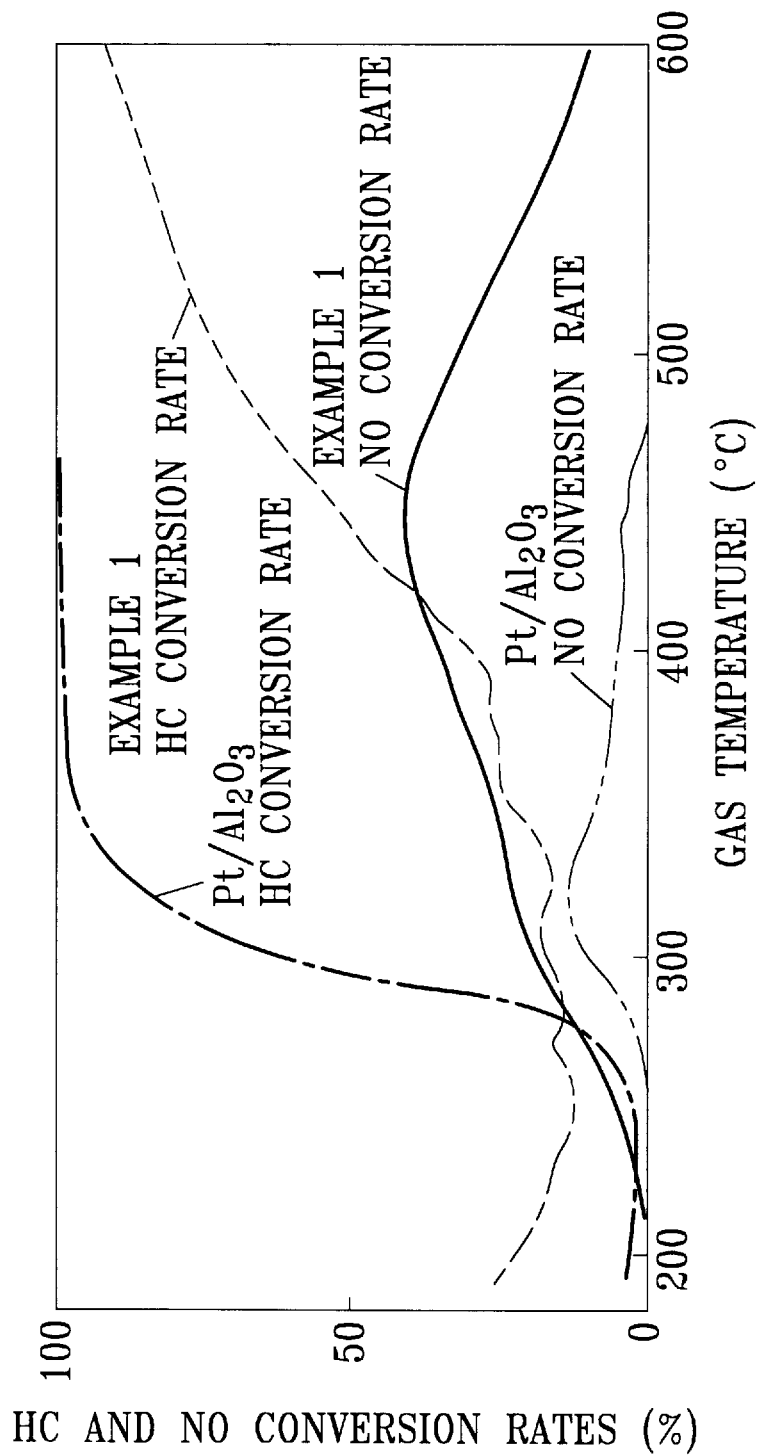
FIG. 15 is a fifth example of a graph showing the relationship between the gas temperature and the HC and NO conversion rates.

FIG. 15 shows the relationship between the gas temperature and the NO and HC conversion rates for example 1. For comparison, the No and HC conversion rates exhibited by the above-described catalyst $Pt/Al_2O_3$ is also given in FIG. 15.

It can be seen from FIG. 15 that the adsorption of HC by the modified N-type ZSM-5 zeolite containing Ag carried therein and the production of active CHO by the partial oxidation of HC are performed in the wide gas temperature range, and as a result, the NO conversion rate is increased more than the case where the $Pt/Al_2O_3$ is used.

Embodiment

An example of an exhaust emission control catalyst according to embodiment 6 is formed from $LaCoO_3$ having an average crystalline grain size D in a range of D<500Å, and a zeolite with Ag carried therein as in the embodiment 5. The content C of LaCoO$_3$ is set in a range of 20% by weight $\leq C \leq 80\%$ by weight, and the content CA of Ag borne is set in a range of 1% by weight $\leq CA \leq 10\%$ by weight, as in embodiment 5.

Another example of an exhaust emission control catalyst according to this embodiment is formed from LaCoO$_3$ with Pt borne therein, as in embodiment 3. In this case, the content C of Pt borne is set in a range of 0.01% $\leq CA \leq 0.5\%$ by weight.

Various pellet-like catalysts were produced in the same manner as in embodiment 2 using the modified H-type ZSM zeolite used in embodiment 2 with Ag borne therein, an unmodified H-type ZSM-5 zeolite with Ag borne therein and an modified R-type ZSM-5 zeolite with no Ag borne therein, and LaCoO$_3$, and Pt/LaCoO$_3$ with 0.03% by weight of Pt borne therein. These catalysts were subjected to an NO conversion test similar to that described in embodiment 2.

Table 8 shows the composition of each of the various catalysts and the NO conversion rates at different temperatures.

In this case, the average crystalline grain size D of LaCoO$_3$ is equal to 490 Å.

Figure 18:
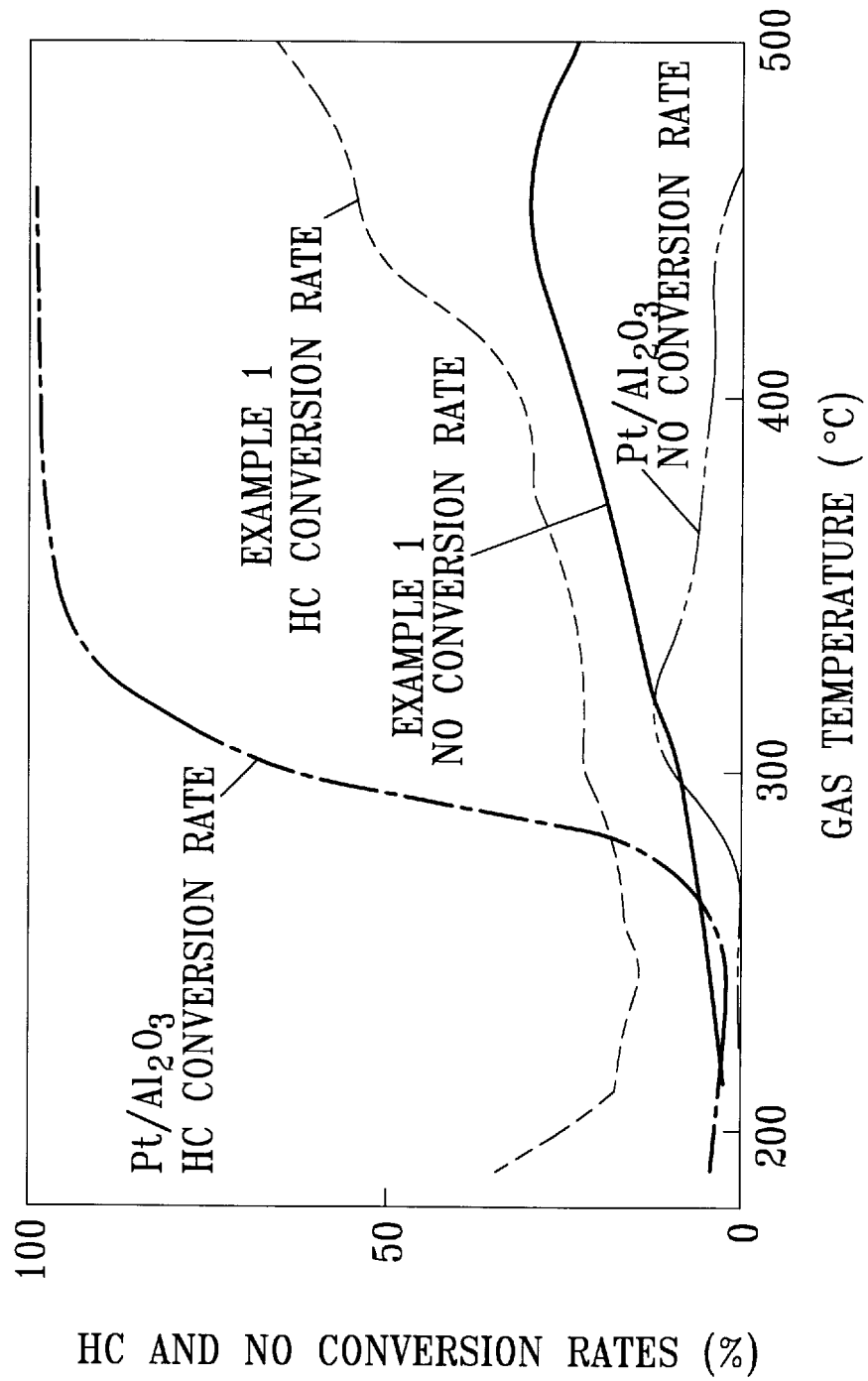
FIG. 18 is a sixth examples of a graph showing the relationship between the gas temperature and the HC and NO conversion rates.

FIG. 18 shows the relationship between the gas temperature and the HC and NO conversion rates for example 1. For comparison, the HC and NO conversion rates provided by the before-mentioned catalyst Pt/Al$_2$O$_3$ are also given in FIG. 18.

It can be seen from FIG. 18 that for the catalyst example 1, the adsorption of RC by the modified H-type ZSM-5 zeolite containing Ag carried therein and the production of active CHO by the partial oxidation of HC are performed in the wide gas temperature range, and as a result, the NO conversion rate is increased more than the case where the Pt/Al$_2$O$_3$ catalyst is used.

Embodiment 7

An example of an exhaust emission control catalyst according to this embodiment is formed from a mixture of cerium oxide (CeO$_2$) having an average crystallite grain size D in a range of D<500 Å and LaCeO$_3$ having a similar average crystalline grain size D, and a zeolite containing Ag carried therein as in Example 5. The content C of the mixture is set in a range of 20% by weight $\leq C \leq 80\%$ by weight; the contents C$_1$ and C$_2$ of CeO$_2$ and LaCoO$_3$ are set in a range of C$_1$–C$_2$ $\geq 10\%$ by weight, and the amount CA of Ag borne is set in a range of 1% by weight $\leq CA \leq 10\%$ by weight, as in embodiment 5.

TABLE 8

| Catalyst example | Composition (by % weight) | | | | | NO conversion rate (%) | | | |
| --- | --- | --- | --- | --- | --- | --- | --- | --- | --- |
| No. | LaCoO$_3$ | Pt/LaCoO$_3$ | Modified ZSM-5 zeolite | Unmodified ZSM-5 zeolite | Ag | 300° C. | 400° C. | 450° C. | 500° C. |
| 1 | 50 | — | 50 | — | 2.2 | 9 | 23 | 30 | 25 |
| 2 | — | 50 | 50 | — | 2.2 | 10 | 22 | 29 | 24 |
| 3 | 50 | — | — | 50 | 1.4 | 3 | 10 | 18 | 23 |
| 4 | 50 | — | 50 | — | — | 9 | 21 | 24 | 22 |

It can be seen from Table 8 that each of the catalyst examples 1 and 2 made using the modified H-type ZSM-5 zeolite with Ag borne therein exhibits a higher NO conversion rate at each temperature than that exhibited by the example 4 of the catalyst bearing no Ag. Example 3 containing Ag borne in the unmodified H-type ZSM-5 is inferior in characteristic to Examples 1 and 2.

Figure 16:
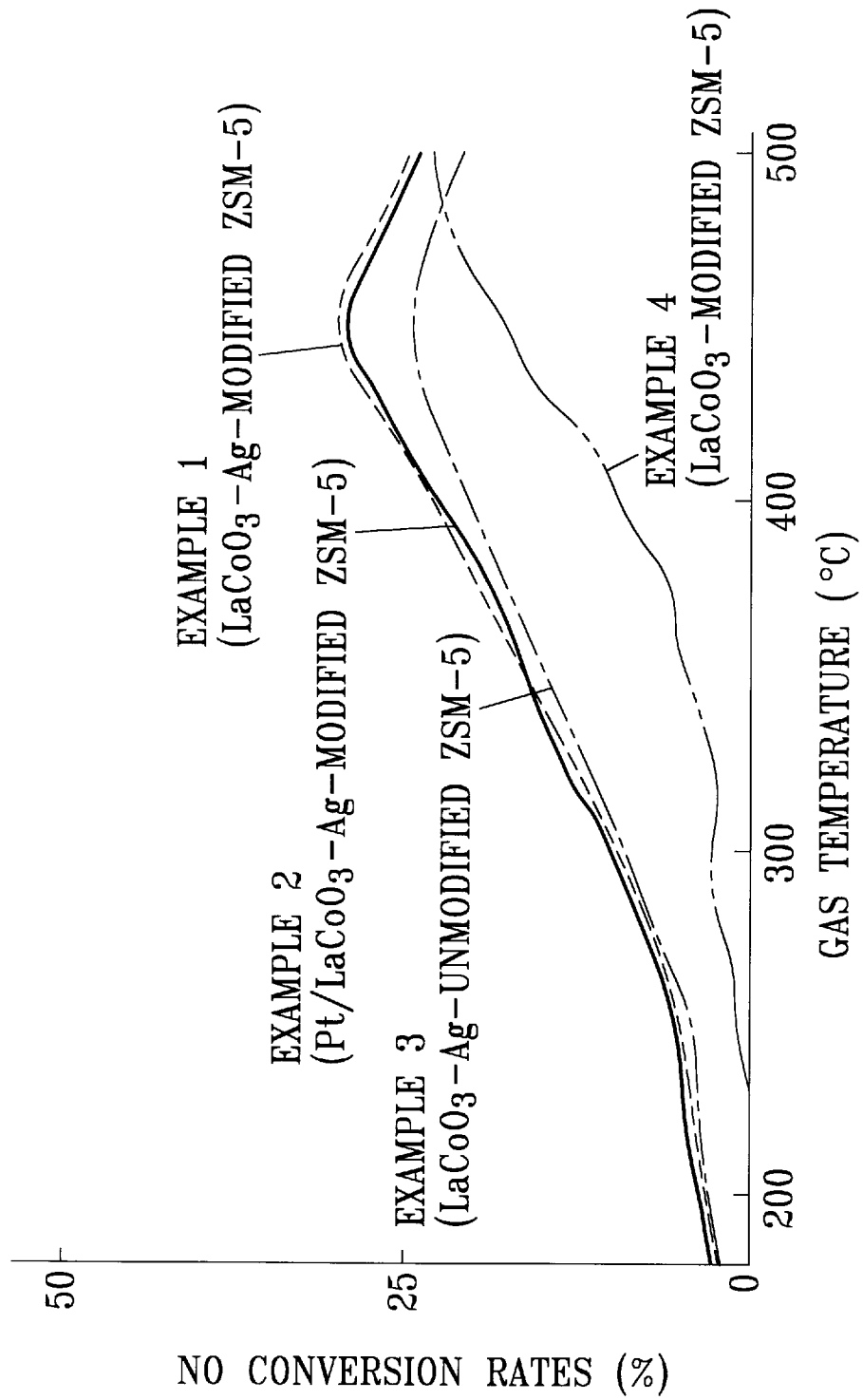
FIG. 16 is a fifth example of a graph showing the relationship between the gas temperature and the NO conversion rates.

FIG. 16 shows the relationship between the gas temperature and the NO conversion rate for the catalyst examples 1 to 4, The Examples 1 to 3 exhibits the maximum NO conversion rate in the gas temperature range of 400° C. to 500° C., as a result of bearing of Ag therein, and for the example 4, the No conversion rate is increased with rising of the gas temperature. Accordingly, it is possible to form a catalyst capable of exhibiting an NO conversion ability over a wider range of gas temperatures by combining each of the examples 1 to 3 with example 4.

Figure 17:
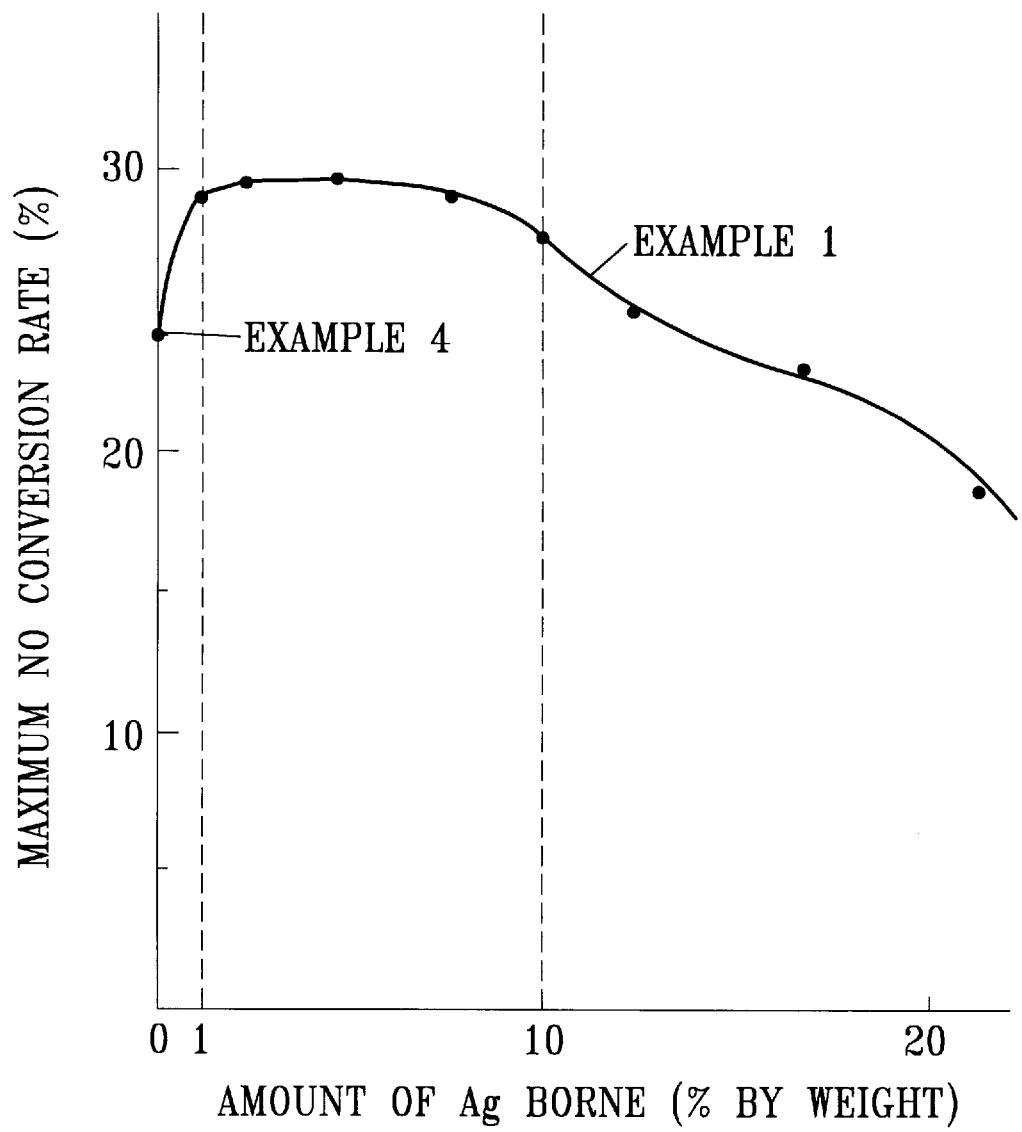
FIG. 17 is a graph showing the relationship between the amount of Ag borne or carried and the maximum NO conversion rate.

FIG. 17 shows the relationship between the amount of Ag borne and the maximum NO conversion rate in catalyst example 1. It is clear from FIG. 17 that it is possible to improve the NO conversion ability by setting the amount CA of Ag borne in a range of 1% by weight $\leq CA \leq 10\%$ by weight.

Another example of an exhaust emission control catalyst is formed from includes LaCoO$_3$ with Pt borne therein as in embodiment 3. In this case, the amount CA of Pt borne is set in a range of 0.01% by weight $\leq CA \leq 0.5\%$ by weight.

Various pellet-like catalysts were produced in the same manner as in embodiment 2 using the modified H-type ZSM-5 zeolite used in embodiment 2 with Ag borne therein, an unmodified H-type ZSM-5 zeolite with Ag borne therein, a modified H-type ZSM-5 zeolite with no Ag borne therein, CeO$_2$, LaCoO$_3$, and Pt/LaCoO$_3$ with 0.03% by weight of Pt borne therein. These catalysts were subjected to an No conversion test similar to that described in embodiment 2.

Table 9 shows the composition of each of the various catalysts and the NO conversion rates at different temperatures. In this case, the average crystalline grain size D of LaCoO$_3$ is equal to 490 Å.

TABLE 9

| Catalyst example | Composition (by % weight) | | | | | | Average crystalline grain size D of CeO$_2$ (Å) | NO conversion rate (%) | | | |
|---|---|---|---|---|---|---|---|---|---|---|---|
| | | | | Modified ZSM-5 | Unmodified ZSM-5 | | | | | | |
| No. | CeO$_2$ | LaCoO$_3$ | Pt/LaCoO$_3$ | zeolite | zeolite | Ag | | 300° C. | 350° C. | 400° C. | 500° C. |
| 1 | 30 | 40 | — | 30 | — | 2.2 | 21 | 38 | 51 | 47 | 25 |
| 2 | 30 | — | 40 | 30 | — | 2.2 | 21 | 40 | 52 | 45 | 23 |
| 3 | 30 | — | 40 | 30 | — | 2.2 | 316 | 18 | 26 | 21 | 15 |
| 4 | 30 | 40 | — | — | 30 | 1.4 | 21 | 31 | 42 | 35 | 17 |
| 5 | 30 | 40 | — | 30 | — | — | 21 | 34 | 41 | 30 | 12 |

Figure 19:
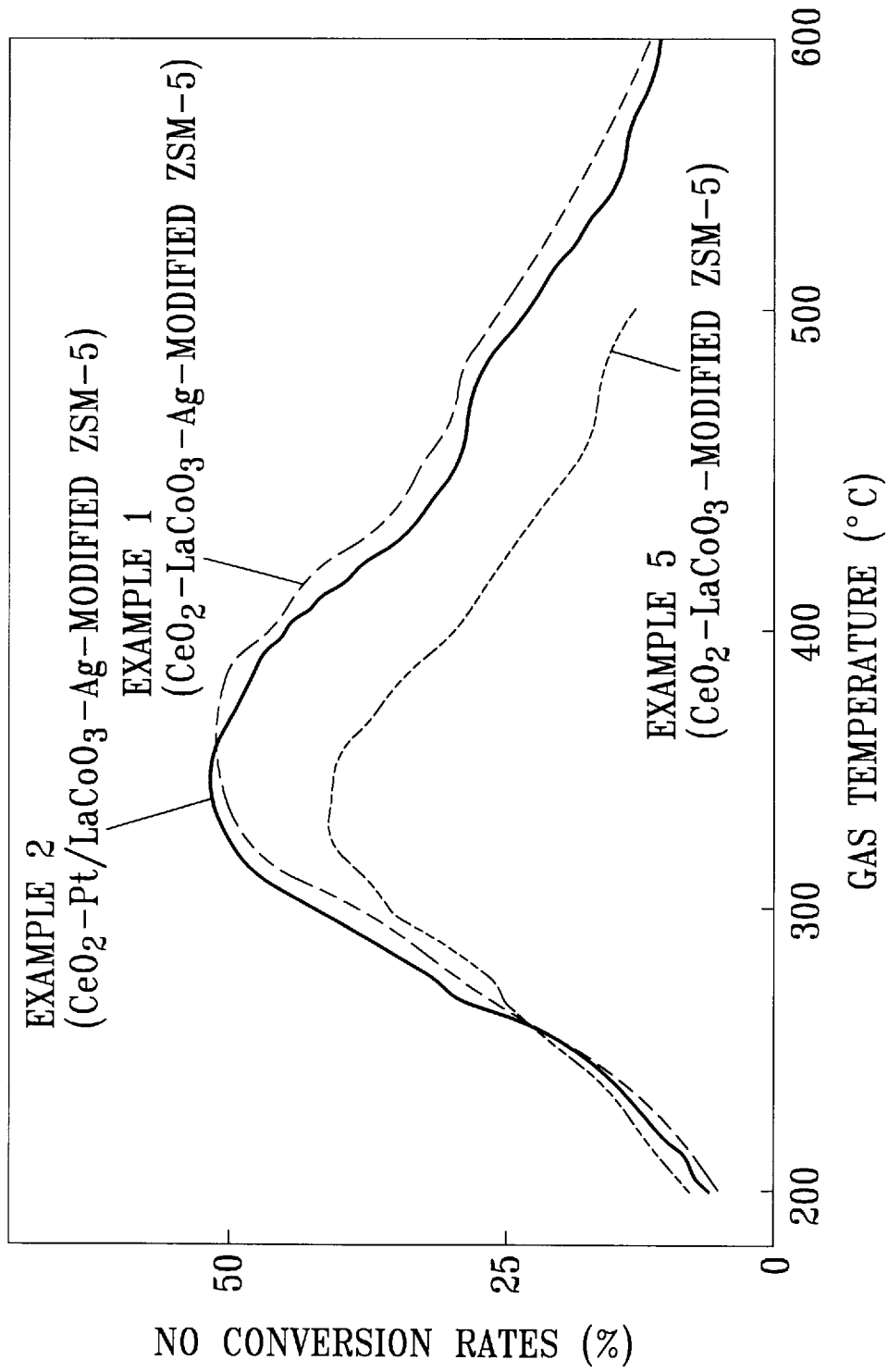
FIG. 19 is a sixth example of a graph showing the relationship between the gas temperature and the NO conversion rates.

FIG. 19 shows the relationship between the gas temperature and the NO conversion rate for examples 1, 2 and 5. It can be seen from FIG. 19 that for the catalyst example 1, the maximum NO conversion rate is improved as a result of the bearing of Ag, as compared with catalyst example 5. The comparison of the catalyst examples 1 and 2 show that the maximum NO conversion rate is shifted to a lower emission temperature side as a result of the bearing of Pt.

By comparing catalyst examples 2 and 3 in Table 9, it is clear that the average crystalline grain size D of CeO$_2$ affects the NO conversion rate and that example 3 is lowered in characteristic, as compared with example 4 which was made using the unmodified H-type ZSM-5 zeolite.

Figure 20:
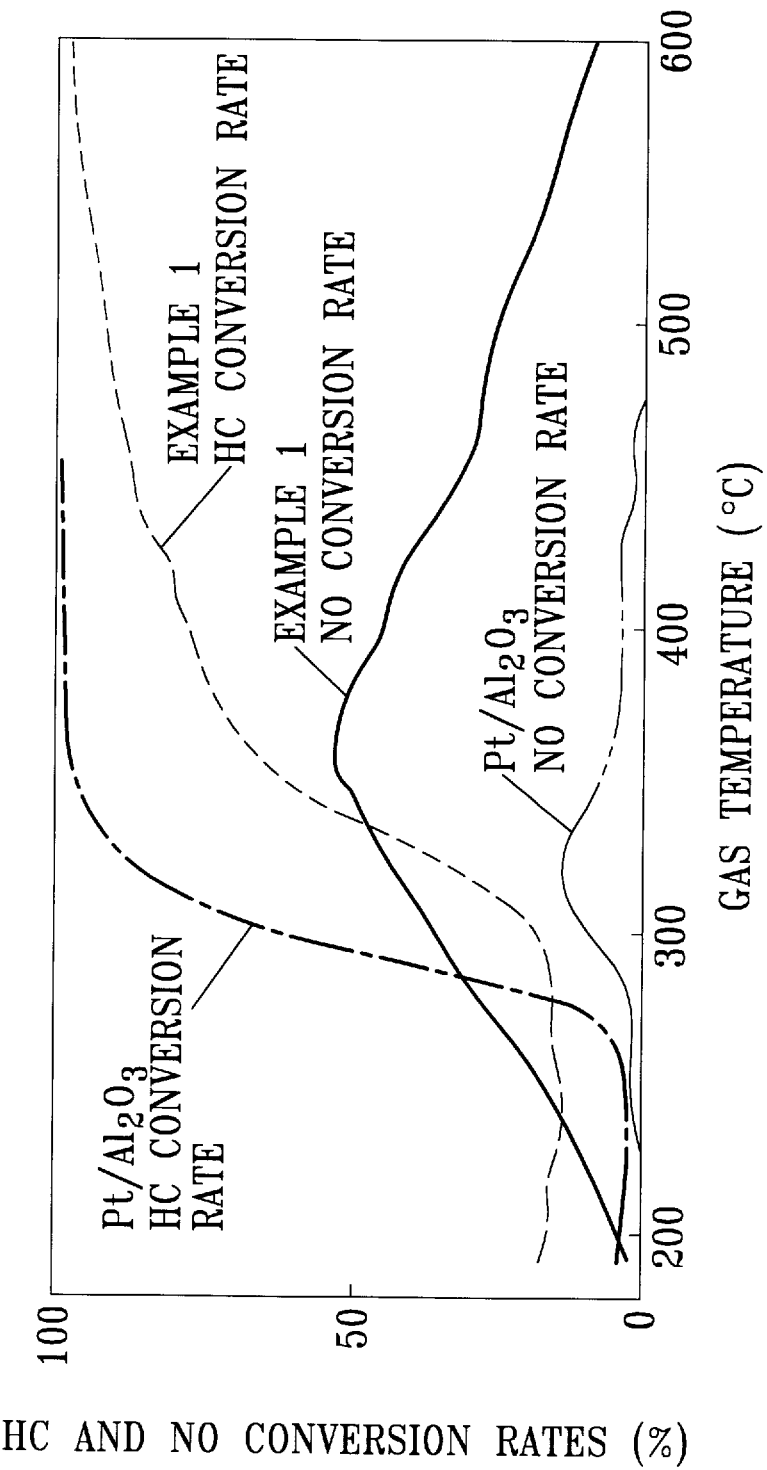
FIG. 20 is a seventh example of a graph showing the relationship between the gas temperature and the HC and NO conversion rates.

FIG. 20 shows the relationship between the gas temperature and the HC and NO conversion rates for the catalyst example 1. For comparison, the HC and NO conversion rates provided by the Pt/Al$_2$O$_3$ catalyst is also given in FIG. 20.

It can be seen from FIG. 20 that for the catalyst example 1, the adsorption of BC by the modified H-type ZSM-5 zeolite containing Ag carried therein and the production of active CHO by the partial oxidation of HC are performed in the wide gas temperature range, and as a result, the No conversion rate is increased more than the case where the Pt/Al$_2$O$_3$ catalyst is used.

Embodiment 8

A. Production of modified CeO$_2$ bearing modified elements

A Zr-bearing modified cerium oxide (CeO$_2$) was produced using Ce(NO$_3$)$_3$ and Zr(NO$_3$)$_4$ in the above-mentioned coprecipitation process.

A Zr-bearing modified cerium oxide (CeO$_2$) was also produced using Ce(NO$_3$)$_3$ and Zr(NO$_3$)$_4$ in the above-mentioned coprecipitation process, and a modified cerium oxide (CeO$_2$) bearing Zr and La was produced in the above-mentioned impregnation process using such cerium oxide (CeO$_2$) and La(NO$_3$)$_3$.

Furthermore, two modified cerium oxides (CeO$_2$) were produced in the impregnation process using powders of La(NO$_3$)$_3$ and CeO$_2$.

Yet further, modified cerium oxide (CeO$_2$) bearing Si was produced using Ce(NO$_3$)$_3$ and silicic acid in the coprecipitation process.

For comparison, a modified cerium oxide (CeO$_2$) bearing Ba was made using Ce(NO$_3$)$_3$ and Ba(NO$_3$)$_2$ in the coprecipitation process.

B. Production of modified ZSM-5 zeolite (a) 500 g of unmodified ZSM-5 zeolite having a molar ratio Mr of SiO$_2$/Al$_2$O$_3$ equal to 30 was placed into a 5N HCl solution at room temperature. Then, the resulting HCl solution was heated to 90° C. and agitated at this temperature for 12 hours to produce a slurry. (b) After cooling down, the slurry was filtered and then, the solid precipitate was rinsed with pure water until the filtrate reached a value of pH equal to or greater than 4. (c) The solid precipitate was dried at 130° C. for 5 hours in the open air, and then, the dried solid material was subjected to a firing at 400° C. for 12 hours to form a massive modified ZSM-S zeolite. (d) The massive modified ZSM-5 zeolite was subjected to a pulverization to provide a powdered modified ZSM-5 zeolite. The molar ratio Mr of SiO$_2$/Al$_2$O$_3$ in the modified ZSM-5 zeolite was equal to 39. Thus, it can be seen that the dealuminization occurred. Furthermore, the modified ZSM-5 zeolite has a heat-resisting temperature of 1,000° C.

C. Production of Catalyst.

A catalyst in a slurry form was prepared by placing 120 g of a modified cerium oxide (CeO$_2$), 60 g of a modified ZSM-5 zeolite, 100 g of 20% silica sol, 360 g of pure water and alumina balls into a pot, and subjecting the mixture to a wet pulverization for 12 hours. In this case, the content C of the cerium oxide (CeO$_2$) was nearly equal to 67% by weight.

A 6 mil cordierite honeycomb support having a diameter of 25.5 mm, a length of 60 mm and 400 cells/in$^2$ was immersed into the slurry-like catalyst. Then, the honeycomb support was removed from the slurry-like catalyst, and the excess amount of the catalyst was removed with a jet of air. Then, the honeycomb support was maintained under heating at 150° C. for 1 hour to dry the slurry-like catalyst. Further, the honeycomb support was subjected to a firing in an electric furnace at 400° C. for 12 hours in the open air. In this case, the amount of catalyst borne in the honeycomb support was of 152 g/liter.

D. NO Conversion Test for assumed exhaust gas

A test gas was prepared which had a composition comprising 10% of CO$_2$, 0.05% of H$_2$, 0.08% of C$_3$H$_6$, 0.08% of NO, 0.1% of CO, 10% of O$_2$, 10% of H$_2$O and the balance of N$_2$. The NO conversion test was carried out in the following manner; the honeycomb bearing the catalyst was placed into a fixed-bed flow reactor device and then, the test gas was forced to flow at a space velocity S.V. of $5 \times 10^4$ h$^{-1}$ through the reactor device.

The temperature of the test gas was risen at a predetermined rate up to 50° C. and maintained at this temperature, namely, a steady state at an interval of 50° C. was developed, while the NO conversion rate was measured at that temperature.

Table 10 shows the average crystalline grain size D of CeO$_2$, the modifying elements the proportion by weight of the modifying elements in the modified CeO$_2$, and the NO conversion rate at each of the measuring temperatures for examples 1 to 7 of the unused catalysts. Data shown by a catalyst example 8 made using an unmodified CeO$_2$ and using no modified CeO$_2$ are also given in Table 10.

TABLE 10

UNUSED CATALYSTS

| Catalyst example No. | Modified Cerium oxide ($CeO_2$) | | | NO conversion rate (%) | | | | |
|---|---|---|---|---|---|---|---|---|
| | Average crystalline grain size D of $CeO_2$ (Å) | Modifying element | Weight proportion of modifying element (% weight) | 300° C. | 350° C. | 400° C. | 450° C. | 500° C. |
| 1 | 94  | Zr      | 9.2             | 12 | 35 | 59 | 64 | 48 |
| 2 | 106 | Zr + La | Zr:8.8; La:5.1  | 11 | 35 | 56 | 58 | 47 |
| 3 | 102 | La      | 1               | 13 | 36 | 54 | 42 | 41 |
| 4 | 102 | La      | 10.2            | 12 | 35 | 55 | 42 | 39 |
| 5 | 72  | Si      | 10              | 14 | 37 | 53 | 40 | 40 |
| 6 | 98  | Ba      | 1               | 7  | 17 | 28 | 21 | 19 |
| 7 | 99  | Ba      | 9.8             | 2  | 3  | 5  | 4  | 4  |
| 8 | 78  | —       | —               | 13 | 36 | 55 | 42 | 40 |

From Table 10, it can be seen that each of the catalyst examples 1 to 5 according to embodiment 8 of the present invention exhibits an excellent NO conversion rate, as compared with the comparative examples 6 to 7 of the catalysts. Further, in an unused state, each of the catalyst examples 1 and 2 made using the modified cerium oxide ($CeO_2$) bearing Zr or both Zr and La shows a higher NO conversion rate than that shown by the catalyst example 8 made using the unmodified cerium oxide ($CeO_2$), but each of the catalyst examples 3 to 5 made using the modified cerium oxide ($CeO_2$) bearing only La or only Si shows the substantially the same NO conversion rate as of the catalyst example 8.

Then, the unused catalyst examples 1 to 5 and 8 were subjected to a thermal deterioration treatment in the ambient atmosphere at 700° C. for 20 hours and then, they were subjected to an NO conversion test under the same conditions, thereby providing results shown in Table 11.

TABLE 11

CATALYSTS AFTER THERMAL DETERIORATION TREATMENT

| Catalyst example No. | Modified Cerium oxide ($CeO_2$) | | | NO conversion rate (%) | | | | |
|---|---|---|---|---|---|---|---|---|
| | Average crystalline grain size D of $CeO_2$ (Å) | Modifying element | Weight proportion of modifying element (% weight) | 300° C. | 350° C. | 400° C. | 450° C. | 500° C. |
| 1 | 117 | Zr      | 9.2            | 7 | 21 | 32 | 36 | 34 |
| 2 | 118 | Zr + La | Zr:8.8; La:5.1 | 9 | 22 | 35 | 39 | 35 |
| 3 | 109 | La      | 1              | 9 | 19 | 31 | 34 | 33 |
| 4 | 109 | La      | 10.2           | 9 | 18 | 32 | 39 | 34 |
| 5 | 100 | Si      | 10             | 9 | 18 | 32 | 35 | 33 |
| 8 | 316 | —       | —              | 6 | 18 | 26 | 27 | 20 |

It can be seen from Table 11 that each of the catalyst examples 1 to 5 according to the embodiment 8 of the present invention, even after being subjected to the thermal deterioration treatment, shows a higher NO conversion rate than that shown by example 8, and hence, has an excellent thermal deterioration-resistance. The difference between the NO conversion rates shown by each of the catalyst examples 1 to 5 and the example 8 is due to the difference between the physical properties of the modified cerium oxide ($CeO_2$) and the unmodified cerium oxide ($CeO_2$). Further, it can be also seen by comparing Tables 10 and 11 that the average crystalline grain size D of $CeO_2$ is increased by the thermal deterioration treatment.

Effect of the Invention

According to the features in claims 1 to 3, it is possible to provide an adsorbent which is made from an oxide-based ceramics having an average crystalline grain size D specified in the above-described range and which is capable of exhibiting an excellent adsorption ability to nitrogen oxides.

According to the features in claims 4 to 17, it is possible to provide a catalyst which includes an adsorbent of the above-described type as a necessary component and which is capable of exhibiting an excellent adsorption ability to nitrogen oxides over a wider gas temperature range. According to the features in claims 6 to 11, it is possible to significantly enhance the thermal deterioration-resistance of the catalyst.

What is claimed is:

1. An exhaust emission control catalyst for purifying nitrogen oxides (NOx) in an exhaust gas through contact therebetween, said exhaust gas including the nitrogen oxides, hydrocarbon (HC) and excess oxygen, said exhaust emission control catalyst comprising a mixture of $CeO_2$ crystallite particles and zeolite particles of dealuminized ZSM-5 zeolite, wherein a content C of said $CeO_2$ crystallite particles is in a range of 10% by weight $\leq C \leq 80\%$ by weight, wherein said $CeO_2$ crystallite particles are comprised of polycrystalline aggregates having an average crystalline grain size D of D<500 Å, and wherein said $CeO_2$ crystallite particles are present on and adjacent surfaces of said zeolite particles.

2. The catalyst of claim 1, further comprising double oxide particles which are mixed with said $CeO_2$ crystallite particles and said zeolite particles, wherein a total content $C_1$ of said $CeO_2$ crystallite particles and said double oxide particles is in a range of 20% by weight $\leq C_1 \leq 90\%$ by weight, with said $CeO_2$ crystallite particles being not less than 10% by weight and said double oxide particles being not less than 10% by weight.

3. The catalyst of claim 2, wherein said double oxide particles are $LaCoO_3$ particles.

4. The catalyst of claim 3, wherein said $LaCoO_3$ particles bear Pt in a content of 0.01% by weight $\leq Pt \leq 0.05\%$ by weight.

5. An exhaust emission control catalyst for purifying nitrogen oxides (NOx) in an exhaust gas through contact therebetween, said exhaust gas including the nitrogen oxides, hydrocarbon (HC) and excess oxygen, said exhaust emission control catalyst comprising a mixture of $CeO_2$ crystallite particles and zeolite particles, wherein a content C of said $CeO_2$ crystallite particles is in a range of 10% by weight $\leq C \leq 80\%$ by weight, wherein said $CeO_2$ crystallite particles are comprised of polycrystalline aggregates having an average crystalline grain size D of D<500 Å, and wherein said $CeO_2$ crystallite particles are present on and adjacent to surfaces of said zeolite particles whereby NO is absorbed by said $CeO_2$ particles from the exhaust gas, active CHO is generated by said zeolite particles from the exhaust gas, and an effective oxidation/reduction reaction occurs between the NO and the active CHO by reason of the close proximity of said $CeO_2$ crystallite particles and said zeolite particles, thereby producing $CO_2$, $H_2O$ and $N_2$.

6. The catalyst of claim 1, further comprising double oxide particles which are mixed with said $CeO_2$ crystallite particles and said zeolite particles, wherein a total content $C_1$ of said $CeO_2$ crystallite particles and said double oxide particles is in a range of 20% by weight $\leq C_1 \leq 90\%$ by weight, with said $CeO_2$ crystallite particles being not less than 10% by weight and said double oxide particles being not less than 10% by weight.

7. The catalyst of claim 6, wherein said double oxide particles are $LaCoO_3$ particles.

8. The catalyst of claim 7, wherein said $LaCoO_3$ particles bear Pt in a content of 0.01% by weight $\leq Pt \leq 0.5\%$ by weight.

* * * * *